(12) United States Patent
Bader

(10) Patent No.: US 8,915,301 B1
(45) Date of Patent: Dec. 23, 2014

(54) TREATMENT OF SALINE STREAMS

(76) Inventor: Mansour S. Bader, College Station, TX (US)

(*) Notice: Subject to any disclaimer, the term of this patent is extended or adjusted under 35 U.S.C. 154(b) by 911 days.

(21) Appl. No.: 13/066,841

(22) Filed: Apr. 26, 2011

(51) Int. Cl.
*B01D 61/00* (2006.01)
*C02F 9/00* (2006.01)

(52) U.S. Cl.
CPC .............. *C02F 9/00* (2013.01); *B01D 2311/06* (2013.01)
USPC ........... 166/371; 166/279; 166/300; 166/309; 166/310; 210/640; 210/652; 210/767

(58) Field of Classification Search
CPC .... B01D 2311/04; B01D 2311/06; C02F 9/00
USPC ........................................ 166/371; 210/767
See application file for complete search history.

(56) References Cited

PUBLICATIONS

U.S. Appl. No. 12/380,513, filed Feb. 27, 2009, Bader.

*Primary Examiner* — Tony G Soohoo
*Assistant Examiner* — Peter Keyworth

(57) ABSTRACT

This invention presents innovative methods to treat saline streams such as produced water, seawater, and the like. The invention can be used to: (1) de-NORM produced water; or (2) de-NORM and partially de-salt produced water; or (3) de-NORM and partially de-salt and de-ionize produced water; or (4) de-oil, de-NORM, de-salt and de-ionize produced water. The invention can also be used to de-sulfate seawater and the like in conjunction with desalting plants.

28 Claims, 9 Drawing Sheets

TREATMENT OF SALINE STREAMS

BACKGROUND OF THE INVENTION

Oil-Fields Produced Water and the Like

Formation waters are often produced concurrently with hydrocarbons. Higher amounts of produced water occur during the middle or later stage of the primary production after water breakthrough. A further increase in the amounts of produced water also occurs during the secondary treatment, in which large amounts of external saline water are injected from the surface into the reservoir formation to sustain hydrocarbons production. The amounts of produced waters in some cases could reach 90% or more of the total fluids produced.

Since oil contains a large number (hundreds) of hydrocarbons, many of which are structurally undetermined or difficult to identify, the de-oiling of produced water is an extensive and expensive process. Partial or near efficient de-oiling of produced water might be targeted by two or three conventional processing stages. In the first stage, sludge catchers (e.g., skimmers or any other basic oil separation equipment along with coalescer) are used to separate oil droplets with sizes greater than 100 microns. The second stage targets the removal of dispersed oil droplets with sizes greater than 15-20 microns. Corrugated plate separators or hydrocyclones or centrifuges or electrostatic dehydrators or induced gas flotation without chemical addition or a combination could be used in the second stage. The third (polishing) stage is used to separate oil contents with sizes of about 10 microns from produced water. Induced gas flotation with chemical addition or carbon adsorption or extraction (liquids or supercritical fluids or polymers) or filtration (microfiltration or ultrafiltration) are frequently used in the polishing stage.

Most produced waters are hyper-saline chloride-type that are rich in both sodium and calcium ions. Chloride-rich produced waters that are high in calcium are generally high in alkaline earth cations such as strontium, barium, and in some cases radium. Some of the naturally occurring isotopes of strontium (Sr-87) and barium (Ba-130 and Ba-132) are radioactive. In addition, the availability of radium in produced water suggests that the decay series of radium's isotopes is common and such water is radioactive. Radium sources in produced water are either uranium (U-238) or thorium (Th-232). U-238 and Th-232 exist in subsurface formations as immobile species whereas their daughter nuclides (radium and its isotopes) are transported to the surface via produced water. Once radium isotopes are leached from their lithological origin, they are no longer supported by their ancestors and thus they develop their own decay series. Naturally Occurring Radioactive Materials (NORM) in produced water pose external (near any processing equipment) and internal (during maintenance or workover) radiation hazards. NORM also renders produced waters at the surface as radioactive waste streams. The cost of handling the NORM hazards is substantial (analysis, prevention if possible, treatment, transportation, storage, disposal, equipment decontamination and long-term liability).

Produced water is thus an unwanted waste stream that once its' brought to the surface it becomes too expensive to treat by conventional methods. The cheapest possible way to deal with produced water is probably direct disposal by re-injecting it without treatment into abandoned oil wells or dry holes or geologically selected injection wells or salt caverns. Such disposable sites, however, may not be easily available for producers (technically and/or environmentally prohibitive).

On the other hand, produced water in some areas might be too valuable to waste. However, the only way to offset the high treatment cost of produced water is to render it harmless (NORM removal) and to extract economic values (recovery of salts, usable water, and even oil) from it using innovative and cost effective methods.

Inspection of Table 1 reveals that at least three groups of inorganic species can be selectively segregated from produced water. In the first group of inorganic species, potential radioactive alkaline earth cations (strontium, barium and radium along with its decay series) in the form of sulfate can be selectively separated from produced water. Once produced water is selectively depleted of such radioactive and pyrophoric species, produced water can be used for applications such as oil-fields water injection operations, fire extinguishing and dust control in desert areas.

The second group of inorganic species may include the simultaneous or sequential separation of magnesium hydroxide (brucite) and calcium chloroaluminate or chloroferrate (instead of calcium chloride as given in my previous invention) from produced water as valuable commodities. The recovered brucite can be used as: (1) an agent to scrub air pollutants or to remove transition metals from aqueous streams; (2) an absorbent for silica removal of water and wastewater; (3) a coagulant in water and wastewater treatment; (4) an acid neutralizer or a base stabilizer; and (5) an odor controller. On the other hand, one of the remarkable features of the recovered calcium chloroaluminate or calcium chloroferrate is that its interlayer anions (chloride) can be exchanged with various charged species. Such a high anion-exchange capacity can be employed, for instance, to selectively deplete sulfate from saline stream and the like in a precipitation setup or in an anion-exchange setup. In addition, calcium in the form of chloroaluminate or chloroferrate is very tolerant to high temperatures.

The third group of inorganic species in produced water includes sodium and potassium chloride (sylvinite). Sylvinite is a salt that consists of sodium and potassium chloride but dominated by sodium chloride. Sylvinite is the dominant salt in produced water, and thus it's partial or near complete separation from produced water will also produce partial or near complete de-ionization of produced water. Sylvinite can be used in applications such as road de-icing, animals feeding, water softening and food processing.

This patent provides innovative near zero- or zero-discharge methods that allow the conversion of produced waters as unwanted waste streams to reusable products. The first objective of this invention is to de-NORM and partially de-salt readily and sufficiently de-oiled produced water. The second objective of this invention is to de-NORM, and partially de-salt and de-ionize readily and sufficiently de-oiled produced water. The third objective of this invention is to de-oil, de-NORM, and partially de-salt and de-ionize produced water.

Seawater and the Like of Sulfate-Rich Streams

FIG. 1 shows an oversimplified flow diagram for a recently installed Multi-Stage Flash (MSF) seawater desalination plant in the Arabian Gulf area. The plant mainly consists of three major sections: (1) brine heater; (2) heat recovery; and (3) heat rejection. On the hot side of the plant, the brine heater is driven by low-pressure and medium pressure steam. The brine heater is the driving unit for the flashing process by heating the recycle brine to the desired or designed top brine temperature. The top brine temperature is thus one of the most important parameter in thermal desalting plants. The flashing process of the recycle brine takes place in the heat recovery and heat rejection sections. The number of stages in the heat recovery section is 20 while the number of stages in the heat rejection section is 3. Within the heat recovery and heat rejection sections, vapor flashes off and the brine saturation temperature in each consecutive stage gradually decreases. As such, the brine flows across the stages from the hotter to the colder side of the heat recovery and heat rejection sections without any pumping aids. The flashed off vapor condenses on the tubes side of the condenser/pre-heater units and accumulates across the heat recovery and heat rejection sections as distillate. The released latent heat of the condensed vapor is used to preheat the recycle brine stream.

On the cold side of the plant, pretreated (may include screening, chlorination, coagulation and filtration) seawater feed stream along with seawater cooling stream introduce into condenser/pre-heater units of the last stage of the heat rejection section. As seawater feed stream leaves the heat rejection section, it's mixed with additives (e.g., anti-scale and anti-foam), and passed through a vacuum de-aerator. The de-aerated seawater feed stream is mixed with a portion of the reject brine along with an oxygen scavenger, and then is introduced to the last stage of the heat recovery section as a recycle brine. A portion of the cooling seawater stream leaving the heat rejection section is recycled for mixing with the incoming seawater cooling stream to maintain a constant temperature at the entrance of the heat rejection section. The remaining portions of seawater cooling stream and the reject brine are blown down to the sea.

However, the presence of thermally unstable ions (bicarbonate, magnesium and calcium) severely limits the design capacity of seawater desalting plants. The bicarbonate ion in seawater feed stream would thermally breakdown in pre-heaters into hydroxide ion and carbon dioxide. The release of the hydroxide ion (increases the pH value) along with the rise in seawater temperature trigger brucite precipitation. In the recently installed MSF plant (FIG. 1), the pre-heated seawater in the heat rejection section would allow partial thermal breakdown of the bicarbonate ion to release carbon dioxide (to be removed by the vacuum de-aerator) while brucite precipitation remains unsolved. It's worth noting, however, that the typical practice in desalination plants is that the seawater pre-treatment section includes a de-alkalization step by dosing an acid (e.g., sulfuric acid) to convert bicarbonate to carbon dioxide, removing carbon dioxide by a vacuum de-aerator, and neutralizing the recycle brine (e.g., caustic soda such as sodium hydroxide) to re-adjust its pH value.

The calcium ion has two possible forms of sulfate (anhydrite and/or hemihydrate) at the plant top brine temperatures range (90-110° C.). The solubility limits of calcium sulfate anhydrite or hemihydrate are inversely and steeply proportional with temperatures. Inhibitors are added to delay the precipitation of such sulfate scales. However, the temperature tolerance limit of the added inhibitor dictates the top brine temperature (e.g., the temperature limit for polyphosphates is 90° C. and for polycarboxylates or polymeric is 110° C.). In addition, their limited effect in solving sulfate scale dictates the maximum total dissolved solids (TDS) of the reject brine (TDS of the blow down brine stream is limited to about 65,000 mg/L to avoid severe sulfate scale problems within the heat recovery and heat rejection sections).

An effective de-scaling (alkaline and far more importantly sulfate scale) step is thus essential in seawater desalination plants. Such a de-scaling step would allow: (1) better performance ratio (ratio of distillate flow rate to heating steam) and thus more efficient and cost effective plants; (2) higher volume of reject brine for recycling, which in turn, leads to smaller volumes of both the brine blown down stream, and more importantly the seawater feed stream (substantial savings on pumping power, chlorination and filtration, and additives); (3) the elimination of scale inhibitors; (4) the plant to reach its designed top brine temperature (130-150° C.) and thus increases distillate production; (5) fewer shut-downs for de-scaling maintenance; and (6) slower decrease of heat exchange coefficients.

As such, the fourth objective of this invention is to effectively eliminate the scale issues, particularly the sulfate scale, in desalination plants to achieve the above mentioned benefits.

SUMMARY OF THE INVENTION

In one aspect, the present invention provides a method for separating alkaline earth cations, brucite along with calcium chloroaluminate or calcium chloroferrate from produced water to produce partially de-salted produced water. The inventive method comprises the steps of: (a) removing alkaline earth cations from produced water; (b) removing brucite from a second intermediate stream of produced water; (c) removing calcium chloroaluminate or calcium chloroferrate from a third intermediate stream of produced water; (d) injecting the partially de-salted produced water into subterranean formation for hydrocarbons recovery; or (e) using the partially de-salted produced water for oil-fields fire extinguishing; or (f) using the partially de-salted produced water for dust control; or (g) producing de-ionized water from the partially de-salted produced water by membrane distillation. Alkaline earth cations are removed from produced water in step (a) by: (i) mixing sulfate-rich saline water with produced water to produce a first intermediate stream by allowing the concentration of sulfate to exceed the concentration of strontium in the first intermediate stream; (ii) pressurizing the first intermediate stream into a first precipitator at pressure between 30 psi and 1,100 psi through at least one nozzle to produce a jet stream of the first intermediate stream; (iii) pressurizing an amine solvent into the first precipitator at pressure between 30 psi and the critical pressure of the amine solvent through at least one nozzle to form precipitates comprising alkaline earth cations from the first intermediate stream; (iv) removing precipitates from the first intermediate stream by a first filter to produce alkaline earth cations slurry and a second intermediate stream; (v) separating alkaline earth cations slurry into dewatered alkaline earth cations precipitates and a first liquor stream by a first vacuum filter; (vi) recovering at least most of the remaining amine solvent from the first liquor stream by the first vacuum filter; and (vii) recycling the first liquor stream to the first precipitator. Brucite is removed from the second intermediate stream in step (b) by: (i) pressurizing the second intermediate stream into a second precipitator unit at pressure between 30 psi and 1,100 psi through at least one nozzle to produce a jet stream of the second intermediate stream; (ii) pressurizing an amine solvent into the second precipitator unit at pressure between 30 psi and the critical pressure of the amine solvent through at least one nozzle to form precipitates comprising brucite from the second intermediate stream; (iii) removing precipitates from the second intermediate stream by a second filter to produce brucite slurry and a third intermediate stream; (iv) separating brucite slurry into dewatered brucite precipitates and a second liquor stream by a vacuum filter; (v) recovering at least most of the remaining amine solvent from the second liquor stream by the vacuum filter; and (vi) recycling the second liquor stream to the second precipitator unit. Calcium chloroaluminate or calcium chloroferrate is removed from the third intermediate stream in step (c) by: (i) mixing the third intermediate stream with an aluminum or iron source to produce a blended third intermediate stream; (ii) pressurizing the third blended intermediate stream into a third precipitator at pressure between 30 psi and 1,100 psi through at least one nozzle to produce a jet stream of the blended third intermediate stream; (iii) pressurizing the amine solvent into the third precipitator at pressure between 30 psi and the critical pressure of the amine solvent through at least one nozzle to form precipitates of calcium chloroaluminate or calcium chloroferrate from the third blended intermediate stream; (iv) removing the precipitates from the blended third intermediate stream by a third filter to produce slurry of calcium chloroaluminate or calcium chloroferrate and a fourth intermediate stream; (v) separating the slurry into dewatered precipitates and a third liquor stream by another vacuum filter; (vi) recovering at least most of remaining amine solvent from the third liquor stream by the vacuum filter; (vii) recycling the third liquor stream to the third precipitator; and (viii) removing at least most of the amine solvent from the fourth intermediate stream by a stripping unit to produce the partially de-salted produced water.

Alkaline earth cations are strontium, barium, radium, radon, polonium, bismuth, thallium, lead, or a combination thereof. Produced water is oil-fields produced water, methane-bed produced water, coal-bed produced water, formation water, or a combination thereof. Sulfate-rich saline water is seawater, brine (concentrate) streams from pressure-driven or thermal-driven seawater desalination plants, natural brine, brackish water, agricultural drainage water, flue gas desulphurization water, or a combination thereof. The injection jet nozzle is coaxial nozzle, spray nozzle, vibrating nozzle, premixed nozzle, or a combination thereof. The amine solvent is selected from the group consisting of isopropylamine, propylamine, dipropylamine, diisopropylamine, ethylamine, diethylamine, methylamine, dimethylamine, or a combination thereof. The filter is hydrocyclone, microfiltration, ultrafiltration, vacuum filter, press filter, centrifuge, electrostatic filter, or a combination thereof. Aluminum sources include calcium aluminate, sodium aluminate, aluminum acetate, aluminum chlorohydrate, and aluminum chloride. Iron sources include calcium ferrate, sodium ferrate, and iron chloride. The stripping unit is flash tank, distillation column, vacuum distillation, vacuum membrane distillation, vacuum deaerator, pervaporation, or a combination thereof. The membrane distillation is vacuum membrane distillation, direct contact membrane distillation, membrane osmotic distillation, or a combination thereof.

In another aspect, the present invention provides a method for separating alkaline earth cations, brucite along with calcium chloroaluminate or calcium chloroferrate from produced water to produce partially de-salted produced water. The inventive method comprises the steps of: (a) removing alkaline earth cations from produced water; (b) removing brucite from a second intermediate stream of produced water; (c) removing calcium chloroaluminate or calcium chloroferrate from a third intermediate stream of produced water; (d) injecting the partially de-salted produced water into subterranean formation for hydrocarbons recovery; (e) using the partially de-salted produced water for oil-fields fire extinguishing; or (f) using the partially de-salted produced water for dust control; or (g) producing de-ionized water from the partially de-salted produced water by membrane distillation Alkaline earth cations are removed from produced water in step (a) by: (i) mixing aluminum sulfate or iron sulfate with produced water to produce a first intermediate stream by allowing the concentration of sulfate to exceed the concentration of strontium in the first intermediate stream; (ii) pressurizing the intermediate stream into a first precipitator at pressure between 30 psi and 1,100 psi through at least one nozzle to produce a jet stream of the first intermediate stream; (iii) pressurizing an amine solvent into the first precipitator at pressure between 30 psi and the critical pressure of the amine solvent through at least one nozzle to form precipitates comprising alkaline earth cations from the first intermediate stream; (iv) removing precipitates from the first intermediate stream by a first filter to produce alkaline earth cations slurry and a second intermediate stream; (v) separating alkaline earth cations slurry into dewatered alkaline earth cations precipitates and a first liquor stream by a first vacuum filter; (vi) recovering at least most, of remaining the amine solvent from the first liquor stream by the first vacuum filter; and (vii) recycling the first liquor stream to the first precipitator. Brucite is removed from the second intermediate stream in step (b) by: (i) pressurizing the second intermediate stream into a second precipitator unit at pressure between 30 psi and 1,100 psi through at least one nozzle to produce a jet stream of the second intermediate stream; (ii) pressurizing the amine solvent into the second precipitator unit at pressure between 30 psi and the critical pressure of the amine solvent through at least one nozzle to form precipitates comprising brucite from the second intermediate stream; (iii) removing precipitates from the second intermediate stream by a second filter to produce brucite slurry and a third intermediate stream; (iv) separating brucite slurry into dewatered brucite precipitates and a second liquor stream by a second vacuum filter; (v) recovering at least most of the remaining amine solvent from the second liquor stream by the second vacuum filter; and (vi) recycling the second liquor stream to the second precipitator unit. Calcium chloroaluminate or calcium chloroferrate is removed from the third intermediate stream in step (c) by: (i) mixing the third intermediate stream with an aluminum or iron source to produce a blended third intermediate stream; (ii) pressurizing the third blended intermediate stream into a third precipitator at pressure between 30 psi and 1,100 psi through at least one nozzle to produce a jet stream of the blended third intermediate stream; (iii) pressurizing the amine solvent into the third precipitator at pressure between 30 psi and the critical pressure of the amine solvent through at least one nozzle to form precipitates of calcium chloroaluminate or calcium chloroferrate from the third blended intermediate stream; (iv) removing the precipitates from the blended third intermediate stream by a third filter to produce slurry of calcium chloroaluminate or calcium chloroferrate and a fourth intermediate stream; (v) separating the slurry into dewatered precipitates and a third liquor stream by another vacuum filter; (vi) recovering at least most of remaining amine solvent from the third liquor stream by the vacuum filter; (vii) recycling the third liquor stream to the third precipitator; and (viii) removing at least most of the amine solvent from the fourth intermediate stream by a stripping unit to produce the partially de-salted produced water.

In yet another aspect, the present invention provides a method for separating oil, alkaline earth cations, brucite along with calcium chloroaluminate or calcium chloroferrate from produced water to produce de-oiled and partially de-salted produced water. The inventive method comprises the steps of: (a) separating oil from produced water by hydrophobic membranes to produce de-oiled produced water; (b) removing alkaline earth cations from the de-oiled produced water; (c) removing brucite from a second intermediate stream of de-oiled produced water; (d) removing calcium chloroaluminate or calcium chloroferrate from a third intermediate stream of de-oiled produced water; (e) injecting the de-oiled and partially de-salted produced water into subterranean formation for hydrocarbons recovery; or (f) using the de-oiled and partially de-salted produced water for oil-fields fire extinguishing; or (g) using the de-oiled and partially de-salted produced water for dust control; or (h) producing de-ionized water from the de-oiled and partially de-salted produced water by membrane distillation. Alkaline earth cations are removed from the de-oiled produced water in step (b) by: (i) mixing sulfate-rich saline water with the de-oiled produced water to produce a first intermediate stream by allowing the concentration of sulfate to exceed the concentration of strontium in the first intermediate stream; (ii) pressurizing the first intermediate stream into a first precipitator unit at pressure between 30 psi and 1,100 psi through at least one nozzle to produce a jet stream of the first intermediate stream; (iii) pressurizing an amine solvent into the first precipitator unit at pressure between 30 psi and the critical pressure of the amine solvent through at least one nozzle to form precipitates comprising alkaline earth cations from the first intermediate stream; (iv) removing precipitates from the first intermediate stream by a first filter to produce alkaline earth cations slurry and a second intermediate stream; (v) separating alkaline earth cations slurry into dewatered alkaline earth cations precipitates and a first liquor stream by a first vacuum filter; (vi) recovering at least most of the remaining amine solvent from the first liquor stream by the first vacuum filter; and (vii) recycling the first liquor stream to the first precipitator unit. Brucite is removed from the second intermediate stream in step (c) by: (i) pressurizing the second intermediate stream into a second precipitator unit at pressure between 30 psi and 1,100 psi through at least one nozzle to produce a jet stream of the second intermediate stream; (ii) pressurizing the amine solvent into the second precipitator unit at pressure between 30 psi and the critical pressure of the amine solvent through at least one nozzle to form precipitates comprising brucite from the second intermediate stream; (iii) removing precipitates from the second intermediate stream by a second filter to produce brucite slurry and a third intermediate stream; (iv) separating brucite slurry into dewatered brucite precipitates and a second liquor stream by a second vacuum filter; (v) recovering at least most of the remaining amine solvent from the second liquor stream by the second vacuum filter; and (vi) recycling the second liquor stream to the second precipitator unit. Calcium chloroaluminate or calcium chloroferrate is removed from the third intermediate stream in step (d) by: (i) mixing the third intermediate stream with an aluminum or iron source to produce a blended third intermediate stream; (ii) pressurizing the third blended intermediate stream into a third precipitator at pressure between 30 psi and 1,100 psi through at least one nozzle to produce a jet stream of the blended third intermediate stream; (iii) pressurizing the amine solvent into the third precipitator at pressure between 30 psi and the critical pressure of the amine solvent through at least one nozzle to form precipitates of calcium chloroaluminate or calcium chloroferrate from the third blended intermediate stream; (iv) removing the precipitates from the blended third intermediate stream by a third filter to produce slurry of calcium chloroaluminate or calcium chloroferrate and a fourth intermediate stream; (v) separating the slurry into dewatered precipitates and a third liquor stream by another vacuum filter; (vi) recovering at least most of remaining amine solvent from the third liquor stream by the vacuum filter; (vii) recycling the third liquor stream to the third precipitator; and (viii) removing at least most of the amine solvent from the fourth intermediate stream by a stripping unit to produce the partially de-salted produced water.

In yet another aspect, the present invention provides a method for separating oil, alkaline earth cations, brucite along with calcium chloroaluminate or calcium chloroferrate from produced water to produce de-oiled and partially de-salted produced water. The inventive method comprises the steps of: (a) separating oil from produced water by hydrophobic membranes to produce de-oiled produced water; (b) removing alkaline earth cations from the de-oiled produced water; (c) removing brucite from a second intermediate stream of de-oiled produced water; (d) removing calcium chloroaluminate or calcium chloroferrate from a third intermediate stream of de-oiled produced water; (e) injecting the de-oiled and partially de-salted produced water into subterranean formation for hydrocarbons recovery; or (f) using the de-oiled and partially de-salted produced water for oil-fields fire extinguishing; or (g) using the de-oiled and partially de-salted produced water for dust control; or (h) producing de-ionized water from the de-oiled and partially de-salted produced water by membrane distillation. Alkaline earth cations are removed from the de-oiled produced water in step (b) by: (i) mixing aluminum sulfate or iron sulfate with de-oiled produced water to produce a first intermediate stream by allowing the concentration of sulfate to exceed the concentration of strontium in the first intermediate stream; (ii) pressurizing the first intermediate stream into a first precipitator at pressure between 30 psi and 1,100 psi through at least one nozzle to produce a jet stream of the first intermediate stream; (iii) pressurizing an amine solvent into the first precipitator at pressure between 30 psi and the critical pressure of said amine solvent through at least one nozzle to form precipitates comprising alkaline earth cations from the first intermediate stream; (iv) removing precipitates from the first intermediate stream by a first filter to produce alkaline earth cations slurry and a second intermediate stream; (v) separating alkaline earth cations slurry into dewatered alkaline earth cations precipitates and a first liquor stream by a first vacuum filter; (vi) recovering at least most of remaining amine solvent from the first liquor stream by said first vacuum filter; and (vii) recycling the first liquor stream to the first precipitator. Brucite is removed from the second intermediate stream in step (c) by: (i) pressurizing the second intermediate stream into a second precipitator unit at pressure between 30 psi and 1,100 psi through at least one nozzle to produce a jet stream of the second intermediate stream; (ii) pressurizing the amine solvent into the second precipitator unit at pressure between 30 psi and the critical pressure of the amine solvent through at least one nozzle to form precipitates comprising brucite from the second intermediate stream; (iii) removing precipitates from the second intermediate stream by a second filter to produce brucite slurry and a third intermediate stream; (iv) separating brucite slurry into dewatered brucite precipitates and a second liquor stream by a second vacuum filter; (v) recovering at least most of the remaining amine solvent from the second liquor stream by the second vacuum filter; and (vi) recycling the second liquor stream to the second precipitator unit. Calcium chloroaluminate or calcium chloroferrate is removed from the third intermediate stream in step (d) by: (i) mixing the third intermediate stream with an aluminum or iron source to produce a blended third intermediate stream; (ii) pressurizing the third blended intermediate stream into a third precipitator at pressure between 30 psi and 1,100 psi through at least one nozzle to produce a jet stream of the blended third intermediate stream; (iii) pressurizing the amine solvent into the third precipitator at pressure between 30 psi and the critical pressure of the amine solvent through at least one nozzle to form precipitates of calcium chloroaluminate or calcium chloroferrate from the third blended intermediate stream; (iv) removing the precipitates from the blended third intermediate stream by a third filter to produce slurry of calcium chloroaluminate or calcium chloroferrate and a fourth intermediate stream; (v) separating the slurry into dewatered precipitates and a third liquor stream by another vacuum filter; (vi) recovering at least most of remaining amine solvent from the third liquor stream by the vacuum filter; (vii) recycling the third liquor stream to the third precipitator; and (viii) removing at least most of the amine solvent from the fourth intermediate stream by a stripping unit to produce the partially de-salted produced water.

In yet another aspect, the present invention provides a method for separating brucite and sulfate from sulfate-rich saline stream to produce de-scaled saline stream suitable for desalination processes. The inventive method comprises the steps of: (a) removing brucite and sulfate from sulfate-rich saline stream to produce de-scaled saline stream; (b) feeding the de-scaled saline stream to a desalination process to produce distillate and nearly de-scaled reject brine; (c) blending a portion of the nearly de-scaled reject brine with makeup sulfate-rich saline water to produce recycle brine with low concentrations of brucite and sulfate; (d) removing brucite and sulfate from the recycle brine; and (e) re-feeding the de-scaled recycle brine to the desalination process to re-produce distillate and nearly de-scaled reject brine. Brucite and sulfate are removed from the sulfate-rich saline stream in step (a) by: (i) mixing sulfate-rich saline stream with appropriate amounts of calcium and aluminum additives, or calcium and iron additives through premixing nozzles to form precipitates comprising brucite and calcium sulfoaluminate or calcium sulfoferrate in a precipitator unit; and (ii) removing precipitates from the sulfate-rich saline stream by a filtration unit to produce de-scaled saline stream and dewatered precipitates. Brucite and sulfate are removed from the recycle brine in step (d) by: (i) mixing recycle brine with appropriate amounts of calcium and aluminum additives, or calcium and iron additives through premixing nozzles to form precipitates comprising brucite and calcium sulfoaluminate or said calcium sulfoferrate in the precipitator unit; and (ii) removing the precipitates from the recycle brine by the filtration unit to produce de-scaled recycle brine and dewatered precipitates. Sulfate-rich saline stream is seawater, brine from seawater desalination plants, natural brine, brackish water, flue gas desulphurization spent water, agricultural drainage water, acid mine drainage water, mineral slurry transport water, paper mills spent water, aluminum anodizing spent water, spent water from fertilizer production, lime slaking, or spent water from textile production. Desalination processes are multi-stage flash, multi-effect, vapor-recompression, reverse osmosis, vacuum membrane distillation, direct contact membrane distillation, membrane osmotic distillation, or a combination thereof. Calcium additives are calcium chloroaluminate, calcium chloroferrate, lime, and hydrated lime. Aluminum additives are calcium chloroaluminate, calcium aluminate, sodium aluminate, aluminum acetate, aluminum chloride, aluminum nitrate, aluminum sulfate, and aluminum hydroxide. Iron additives are calcium chloroferrate, calcium ferrate, sodium ferrate, and iron chloride.

This invention is of particular interest in connection with applications such as, but not limited to, oil and gas, saline water desalination, mining, geothermal power plants, flue gas desulphurization, gypsum production, coal or oil fired power plants, industrial boilers, cooling towers, agricultural drainage water, textile, treatment of contaminated water sources such as surface or ground water by natural brine or oil-gas fields brine or brine resulting from all kinds of mining operations (sparingly soluble inorganics, toxic metals, lanthanides, actinides, etc.), treatment of natural brine or oil-gas fields brine or brine resulting from all kinds of mining operations to prevent contaminating water sources such as surface or ground water, and other similar operations.

This invention is not restricted to use in connection with one particular application. This invention can be used, in general, for the selective removal of inorganic from aqueous streams with precipitates ranging from macro- to submicron-sizes. Further objects, novel features, and advantages of the present invention will be apparent to those skilled in the art upon examining the accompanying drawings and upon reading the following description of the preferred embodiments, or may be learned by practice of the invention.

BRIEF DESCRIPTION OF THE DRAWINGS

FIG. 8 illustrates a possible flow diagram for integrating the invented method with MSF plants and the like.

FIG. 9 illustrates another possible flow diagram for integrating the invented method with MSF plants and the like.

DESCRIPTION OF THE PREFERRED EMBODIMENT

The Precipitation Concept

Figure 1:
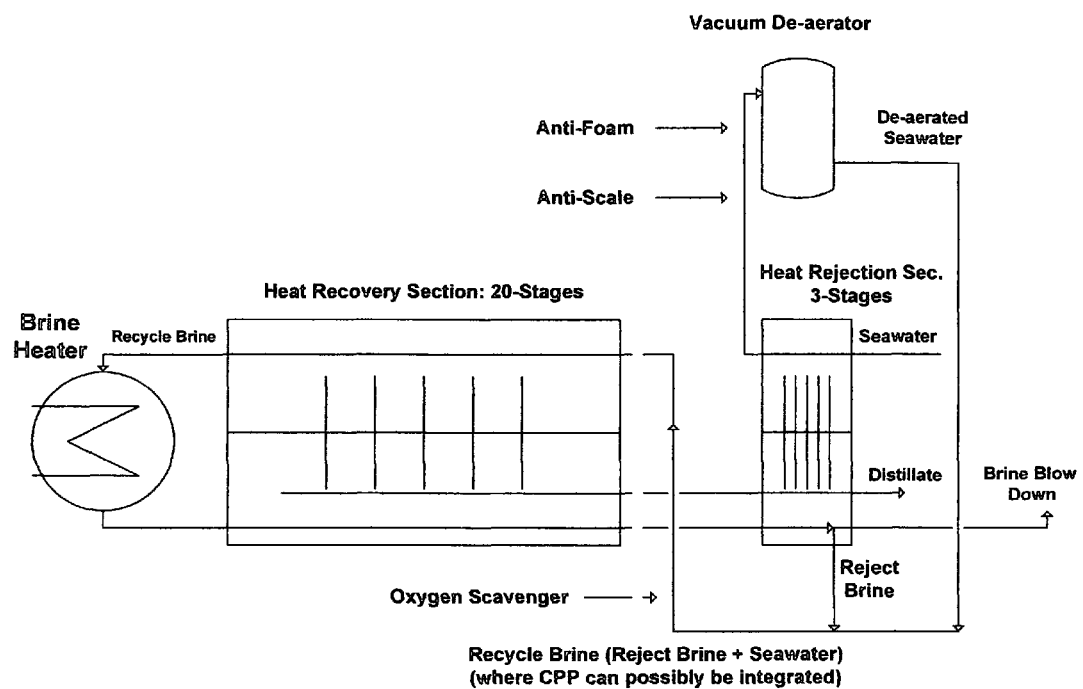
FIG. 1 illustrates an oversimplified flow diagram for a recently installed MSF desalination plant in the Arabian Gulf area.

I have previously invented the Liquid-Phase Precipitation (LPP) process for the separation of inorganic species from aqueous streams. The effect of the separation in the LPP process is to intermix the aqueous solution with a suitable solvent at ambient temperature and atmospheric pressure to form selective precipitates. The suitable solvents are those which have the capability to meet two basic criteria.

The first criteria is the suitability to precipitate targeted inorganic species from aqueous solutions. The selected organic solvent must be miscible with the aqueous phase. Of equal importance, the targeted inorganic species must be sparingly soluble in the organic solvent. The addition of such a solvent to an inorganic-aqueous solution leads to the capture of part of the water molecules and reduces the solubility of inorganic species in the water which form insoluble precipitates. The solubility of the targeted inorganic species in the organic solvent is a critical factor in achieving the degree of saturation. Therefore, solubility related factors such as ionic charge, ionic radius, and the presence of a suitable anion in the aqueous solution (its effect on pH rate) play an important role in affecting and characterizing precipitates formation.

The second criteria is suitability for overall process design. For ease of recovery, the selected solvent must have favorable physical properties such as low boiling point, high vapor pressure, high relative volatility, and no azeotrope formation with water. From a process design standpoint, the selected solvent must have low toxicity since traces of the organic solvent always remain in the discharge stream. Further, the selected solvent must be chemically stable, compatible with the process, and relatively inexpensive.

Several solvents have been identified for potential use in the LPP process. These solvents are isopropylamine (IPA), ethylamine (EA), propylamine (PA), dipropylamine (DPA), diisopropylamine (DIPA), diethylamine (DEA), and dimethylamine (DMA). However, IPA is the preferred solvent in the LPP process. The preference of IPA is attributed to its high precipitation ability with different basic salts, favorable properties (boiling point: 32.4° C.; vapor pressure: 478 mmHg at 20° C.); and minimal environmental risks.

Improving the precipitation process performance is always a target. One of the improvements is to reach saturation faster particularly for inorganics with intermediate aqueous solubility limits or low initial concentrations in aqueous streams. Such an improvement would minimize the use of the amine solvent and reduce the size of the precipitation equipment. Another improvement is to produce controllable precipitates that are uniformly distributed with high yield and preferably in submicron sizes.

Submicron precipitates are fundamentally stable and form spontaneously if a narrow resistance time distribution is improvised and/or a surface active agent (naturally existing or induced) sufficiently acts as a dispersant to prevent immediate agglomeration of the newly formed precipitates. Submicron precipitates are thus dispersed phase with extreme fluxionality. On the other hand, non-spontaneous unstable macrosize precipitates will form if given sufficient time to rest.

The state (stabile, metastabe, or unstable) of given precipitates can be expressed thermodynamically by the Gibbs-Helmholtz relation as follows:

$$\Delta G = \Delta H - T\Delta S \quad (1)$$

where $\Delta G$ is precipitates free energy (provided by, for instance, mechanical agitation or other means), $\Delta H$ is the enthalpy that represents the binding energy of the dispersed phase precipitates in the aqueous stream, T is the temperature, and $\Delta S$ is the entropy of the dispersed phase precipitates (the state of precipitates disorder). The binding energy ($\Delta H$) can be expressed in terms of the surface tension ($\tau$) and the increase in the surface area ($\Delta A$) as follows:

$$\Delta G = \tau \Delta A - T\Delta S \quad (2)$$

When the introduced free energy into the aqueous stream exceeds the binding energy of precipitates, individual precipitates are broken down and redistributed. In addition, when a surface active agent is present in the aqueous stream as an effective dispersant, $\tau$ is reduced and thus the precipitates binding energy is diminished. Furthermore, part of the introduced energy may not contribute to precipitates deflocculating but it dissipates in the aqueous stream in the form of heat which reduces viscosity. All of these factors increase precipitates disorder (positive entropy). As such, the change in the entropy ($\Delta S$) quantitatively defines precipitates dispersion.

The Compressed-Phase Precipitation (CPP) process is thus developed to achieve sub-micron precipitates in certain applications. CPP is conceptually similar to LPP in which the targeted inorganic species must be nearly insoluble in the amine solvent whereas the mother solvent (water) is miscible with the amine solvent. However, the difference is that fluids in the CPP process are subjected to: (1) pressure and/or temperature manipulations; and/or (2) modifications. Thus, they are forced to exhibit unusual thermophysical properties such as liquid-like density but with higher diffusivity, higher compressibility and lower viscosity.

The fast diffusion combined with low viscosity of the compressed amine solvent into the inorganic-aqueous phase produces faster supersaturation of the inorganic species and its possible precipitation in the desired and sub-micron and micron sizes. Thus, the precipitate-size as well as the precipitate-size distribution, morphology, and crystal structure can be controlled. The achievement of faster supersaturation degree would, in turn, minimize the use as well as maximize the recovery of the amine solvent, minimize the size of precipitator vessels, and allow the recovery of the targeted inorganic species in the desired precipitates shape and distribution.

However, several factors could influence the performance of the CPP process. These factors are: (1) the identity and initial concentrations of the targeted inorganic species in the saline stream; (2) the injection or mixing methods of the saline stream, amine solvent, and other additives into the precipitator vessel; and (3) pressures, temperatures, and modifications of both the aqueous stream and the amine solvent. The following discussion highlights the first two factors.

The Targeted Ions in Oil-Fields Produced Water and the Like

The CPP can be employed as a standalone process for the selective and sequential removal of inorganic species from oil-fields produced water and the like. The primary objective is to effectively: (1) deplete radioactive alkaline earth cations (mainly barium, radium and its decay series) preferably in the form of sulfate from produced water; (2) recover brucite; and (3) recover calcium in the form chloroaluminate or chloroferrate. The second objective is the overall economic attractiveness of the CPP process that lies within the optimum and minimum use of the precipitation solvent as well as the purity of the precipitated inorganic species as a waste (radioactive species) or salable by-products (brucite and calcium chloroaluminate or chloroferrate) to offset the cost of the process. The third objective is to provide an environmentally benign (near zero- or zero-discharge) process by efficiently utilizing unwanted waste streams such as produced water from hydrocarbons production facilities by simultaneously rendering such streams harmless (removal of radioactivity) and producing valuable products (usable salts and water).

Figure 2:
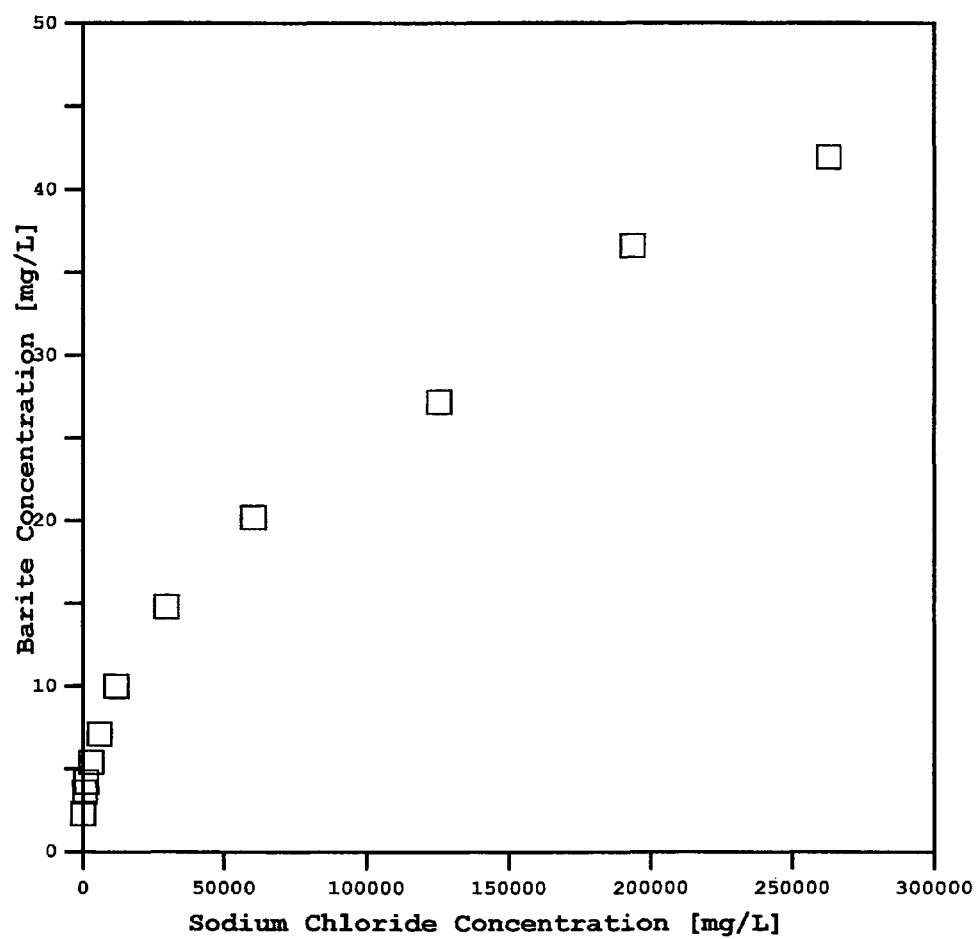
FIG. 2 illustrates the saturation limits of barite as a function of sodium chloride concentrations at ambient temperature.
Figure 3:
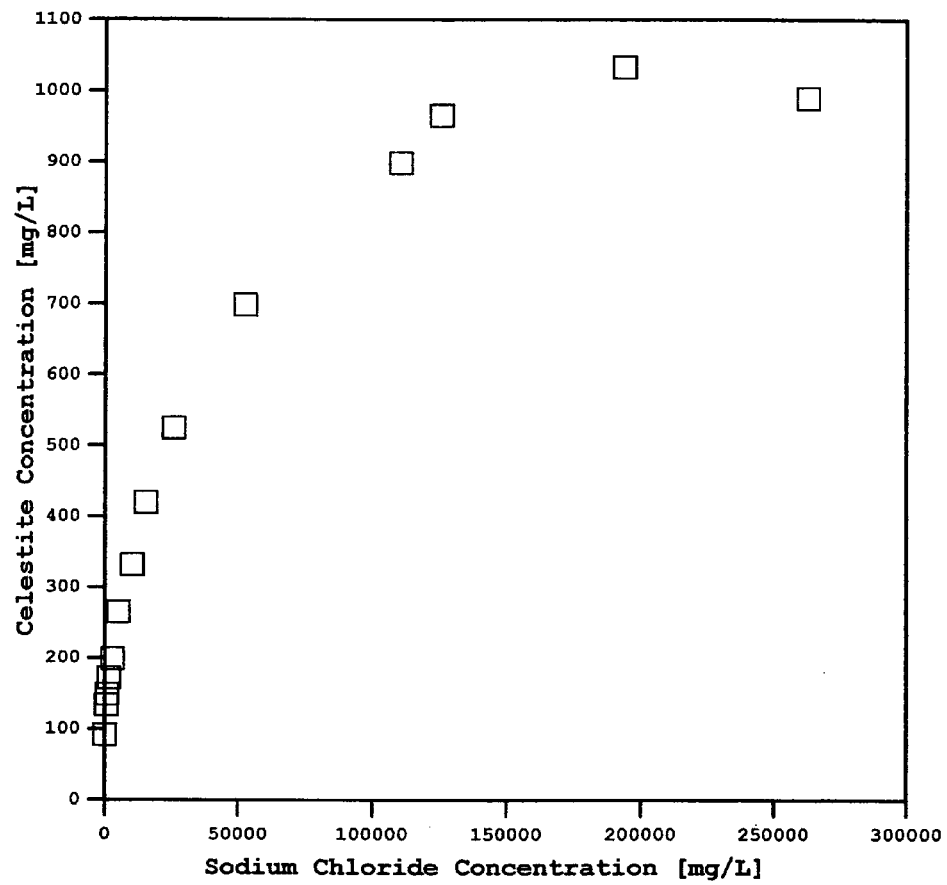
FIG. 3 illustrates the saturation limits of celestite as a function of sodium chloride concentrations at ambient temperature.

Produced waters from hydrocarbons production facilities are typically rich in alkaline earth cations such as calcium, strontium, barium and possibly radium. These cations exist in produced water in the soluble chloride forms. In the forms of sulfate, however, such cations are sparingly soluble in water. FIGS. 2 and 3 show, for instance, the solubility limits of strontium sulfate (celestite), and barium sulfate (barite) as a function of sodium chloride concentrations (the dominant salt in produced water) at ambient temperature. The solubility limit of barite is about one and one-half orders of magnitude lower than the solubility limit of celestite.

Since the naturally occurring radioactive isotopes of barium (Ba-130 and Ba-132) may exist in produced water and the chemical properties of radium are similar to barium, such species along with their radioactivity can be separated and isolated from produced water in the form of sulfate once produced water is brought to the surface. As shown in Table 1, there may be a sufficient amount of sulfate (2.3 meq./L) in produced water to pair with barium (0.2 meq./L). In addition, if the removal of strontium (12.2 meq./L) is also desirable, the deficiency in amount of sulfate to completely pair with strontium in produced water must be overcome.

The unbalanced and small portion of strontium in produced water can be matched (or exceeded) with sulfate from a sulfate-rich saline stream to precipitate strontium along with barium and radium in the form of sulfate without or with the aid of the amine solvent as a precipitation agent. Possible sources for sulfate as a seeding ion to precipitate barite and celestite would be seawater, sulfate-rich natural brine, sulfate-rich agricultural drainage water, or brine from seawater desalination plants such as MSF, reverse osmosis (RO), Multi-Effect (MED), and the like. Table 1 shows ions concentrations in a sample of produced water along with some samples of possible sulfate-rich saline streams.

Table 2 presents ions material balance between produced water and the required volume of sulfate-rich saline water to mainly satisfy the unbalanced portion of strontium in the blended produced water and sulfate-rich saline water. To satisfy the precipitation of barite and celestite, about 20% of total blended volume of produced water and sulfate-rich saline water should be supplied by seawater or sulfate-rich natural brine; or about 10% of such a total blended volume should be supplied by sulfate-rich brine from seawater desalination plants (RO or MSF or MED).

However, an alternative possible sulfate source would be the addition of a small but sufficient amount of aluminum sulfate or iron sulfate to produced water. The selected amine solvents for precipitation are weak bases, which do not furnish the hydroxide ion directly by dissociation. The addition of aluminum or iron sulfate along with an amine solvent to produced water would instantly liberate sulfate (the associated anion). Sulfate would bond with barium and strontium to be precipitated as barite and celestite along with aluminum or iron hydroxide. The added amount of the amine solvent would be extremely small. Otherwise, it would also trigger the simultaneous precipitation of brucite since the solubility limit of brucite is about 13 mg/L at 20° C. The nucleation (induction) period for brucite precipitation is also very fast (about one second) and decreases sharply with increasing the magnesium concentration. Thus, the pH of the mixed stream (the amine solvent and produced water) is the key to allow insignificant or significant precipitation of brucite in the same precipitation stage. It is worth noting that the addition of aluminum or iron sulfate along with the amine solvent to precipitate strontium, barium and radium would also: (1) allow the precipitation of impurities such as transition metals (e.g., zinc, manganese, copper, aluminum, phosphate, iron, cobalt, etc.) that exist in very small concentrations in produced water; and (2) remove to varying degrees silica, boron as well as scale and corrosion inhibitors (that produced water typically contains). The removal of scale and corrosion inhibitors is an important issue, since such inhibitors delay the precipitation process (slow down precipitates growth and/or disperse precipitates).

Once radioactive species (mainly barium and radium) in the form of sulfate along with brucite are selectively and sequentially separated from produced water, the remaining inorganic salts in produced water would be calcium chloride and sodium-potassium chloride (sylvinite). Table 1 indicates that calcium chloride concentration in produced water is about 25% of the total salts. If sources of aluminum or iron along with the amine solvent (or other sources of hydroxide) are added to produced water, calcium chloride can be recovered as calcium chloroaluminate or calcium chloroferrate. In this case, aluminum sources may include, but not limited to, calcium aluminate, sodium aluminate, aluminum acetate, aluminum chlorohydrate, and aluminum chloride. Iron sources may include, but not limited to, calcium ferrate, sodium ferrate, and iron chloride. However, the cheapest possible source of aluminum or iron would be waste sludge from water treatment plants (aluminum chloride or iron chloride). Any of the selected amine solvents would provide the hydroxide ion to reach the optimum pH for the precipitation of calcium chloroaluminate or calcium chloroferrate. Since chloride concentration in produced water is about 4-times calcium concentration, the addition of a calcium source (such as lime or hydrated lime) rather than, or in addition to, the amine solvent: (1) would not only increase the amount of the precipitated calcium chloroaluminate or chloroferrate but also would minimize, if not eliminate, the use of the amine solvent (furnish the hydroxide ion); and thus (2) could further reduce the TDS of the treated produced water (binding with an additional amount of the chloride ion) to make it more amenable to desalination methods.

The Targeted Ions in Seawater and the Like of Sulfate-Rich Streams

The removal of sulfate from seawater (and the like of sulfate-rich streams) can be attained by forming an insoluble sulfate-based mineral. Calcium sulfoaluminate or calcium sulfoferrate are such possible minerals. Their solubility limits are approximately 1 mg/L at 20° C., and thus they are capable of binding most of the sulfate ion in seawater. However, the formation of such minerals precipitates requires the addition of a calcium source as well as an aluminum or iron source to properly engage the existing concentrations of calcium and sulfate ions in seawater.

The possible aluminum sources include, but not limited to, calcium chloroaluminate, calcium aluminate, sodium aluminate, aluminum acetate, aluminum chloride, aluminum nitrate, and aluminum sulfate. The possible iron sources include, but not limited to, calcium chloroferrate, calcium ferrate, sodium ferrate, and iron chloride. However, calcium chloroaluminate and calcium chloroferrate are of particular interest in this invention since they are layered double hydroxides which contain divalent and trivalent cations (calcium along with aluminum or iron) in the outside main layers while their interlayers contain anions (chloride) and water molecules. Within the outside layers, a fraction of calcium hydroxide sheets are substituted with aluminum or iron (trivalent cations), which provides permanent positive charge on the hydroxide layers. The positively charged hydroxide layers are counter-balanced by the negatively charged anion interlayers.

There are several advantages for using calcium chloroaluminate or calcium chloroferrate in this invention. First, their interlayers are highly exchangeable. Sulfate, as a divalent anion, would have a higher affinity to replace chloride (as a monovalent anion) to bind with calcium-aluminum or calcium-iron and thus form calcium sulfoaluminate or calcium sulfoferrate. Second, they provide a dual source for both divalent (calcium) and trivalent (aluminum or iron) cations. Third, they also furnish the needed hydroxide ion for pH elevation. Fourth, they can be produced locally from, for instance, oil-fields produced water and the like as discussed above.

It's worth noting that the precipitation of brucite along with calcium sulfoaluminate or calcium sulfoferrate from seawater or other sulfate-rich saline stream can be conducted respectively in two separate stages or simultaneously in a single stage.

Injection Methods

Various jet injection devices such as premixed nozzles, coaxial nozzles, spray nozzles, vibrating nozzles, ultrasonic nozzles, vortex nozzles, and others can be used in applying the precipitation process. Although the effectiveness of the process lies within the ability of the amine solvent to precipitate inorganic species, the efficiency of the injection device (contact between the amine solvent and/or other additives, and aqueous stream) is also important. If the nucleation (precipitate formation) and condensation (precipitate growth) mechanisms are fast enough, then precipitates will reach a high degree of supersaturation in a very short period of time and within the precipitator vessel. This would allow appreciable reduction in the size of the precipitator vessel and a high degree of precipitates uniformity in submicron sizes.

A possible injection method is to use a nozzle to co-introduce and pre-mix the aqueous stream with the amine solvent before entering the precipitation vessel. This provides a simple and efficient injection method for intensive mass-transfer and fast nucleation of the targeted inorganic species.

A second possible injection method is a concentric nozzle in which the aqueous stream flows through the inner tube while the amine solvent flows through the coaxial annulus. Therefore, the main mechanism of the jet hydrodynamic mixing is that the aqueous stream draws in the amine fluid from the surrounding mass of such a fluid. The smaller the nozzle diameters are the higher the inlet velocities of the compressed fluids. This provides an efficient micro-mixing. The highest nucleation of precipitates takes place at the border of the jet stream (region of contact) whereas the highest condensation of precipitates takes place at the center of the jet stream due to the high turbulence impact and inorganic concentrations in the center of the jet.

A third possible method is to inject the amine solvent (and/or other additives) and aqueous stream into the precipitator vessel via two separate nozzles. If the velocities of the injected fluids are not equal, however, fast and/or a significantly high degree of supersaturation may not be achieved. Therefore, the induction and condensation periods for precipitates will be longer. This could affect the design of the precipitator vessel (the need for a larger instead of a smaller precipitator vessel, further mixing, or precipitates seeding). In addition, a moderate degree of supersaturation leads to larger precipitates.

Underestimation of the mixing step between the aqueous stream and the amine solvent may lead to ineffective design of precipitation vessels. Uniform precipitates are highly desirable for industrial applications. In addition, the quality of dewatering is directly affected by precipitates uniformity and size distribution.

De-Salting Produced Water

De-NORM and Partially De-Salt Produced Water

Figure 4:
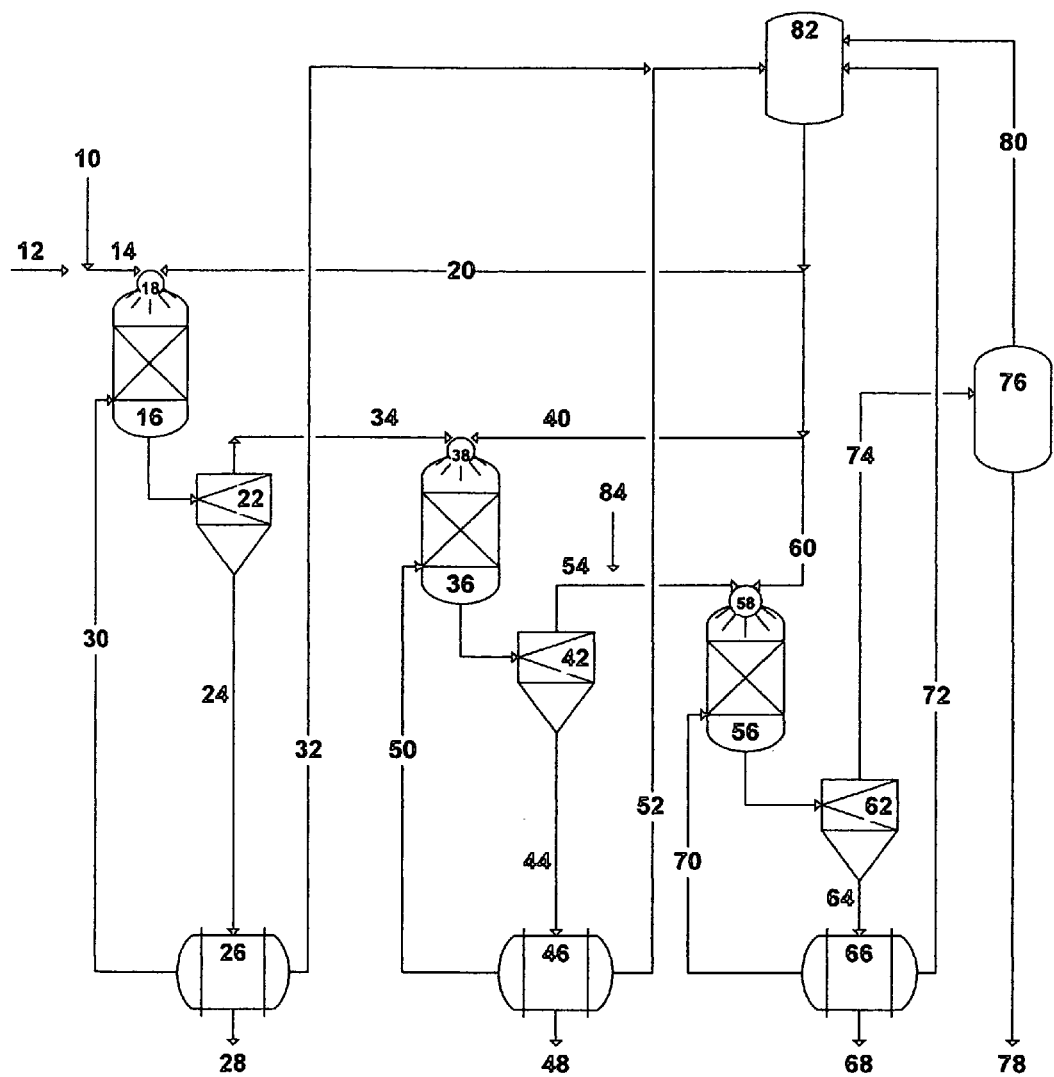
FIG. 4 illustrates a possible flow diagram for the invented method to de-NORM and partially de-salt readily and sufficiently de-oiled produced water.

The CPP process can be employed in three stages as a standalone process for the selective and sequential removal of NORM, brucite, and calcium in the form of chloroaluminate or chloroaferrate from readily and sufficiently de-oiled produced water. FIG. 4 depicts a simplified possible flow diagram illustrating the three stages of the CPP process to de-NORM and partially de-salt produced water. In the first stage, de-oiled produced water [10] will be pre-mixed with a sufficient amount of sulfate-rich saline water [12] to allow the concentration of sulfate (meq./L) to exceed the concentration of strontium (meq./L) in the blended saline stream [14] (Table 2). Alternatively, de-oiled produced water [10] will be pre-mixed with a sufficient amount of aluminum sulfate or iron sulfate [12] (instead of sulfate-rich saline stream) to allow the concentration of sulfate (meq./L) to exceed the concentration of strontium (meq./L) in the blended saline stream. It should be pointed out that if strontium isotopes in produced water do not include Sr-87 (the radiogenic isotope), then the CPP process would target the removal of barium and radium decay series to substantially minimize the use of sulfate-rich saline stream or the use of aluminum or iron sulfate.

The blended saline stream [14] (de-oiled produced water with a sufficient amount of sulfate-rich saline water; or a sufficient amount of aluminum sulfate or iron sulfate) will be injected into the first precipitator unit [16] preferably via the inner tube of at least one concentric nozzle [18]. The pressure of such a blended saline stream is between 30 and 1,100 psi. A selected amine solvent will simultaneously be injected [20] into the same precipitator unit [16] at a pressure ranging between 30 psi and the critical pressure of the amine solvent preferably through the coaxial annulus of the same concentric nozzle [18].

The outlet stream from the first precipitator unit [16] will be fed into the first thickener-stage of hydrocyclones [22] to separate the formed precipitates (mainly barium, radium and radium's decay series). The slurry in the under flow stream [24] of the hydrocyclones [22] will be dewatered by a vacuum filter [26]. The dewatered precipitates [28] will be transferred to a suitable disposal site (if they are radioactive) or recovered as a commodity (if they are not radioactive). The recovered water [30] from the vacuum filter [26] that may contain very fine precipitates will be recycled to the bottom of the first precipitator unit [16]. The recovered amine solvent [32] from the vacuum filter [26] will be recycled to the amine storage tank [82].

In the second stage of the CPP process, brucite is targeted for selective separation from produced water. The over flow stream [34] from the first stage of hydrocyclones [22] that is depleted of mainly barium, radium and radium's decay series will be injected into the second precipitator unit [36] preferably via the inner tube of at least one concentric nozzle [38]. The pressure of such a stream [34] is between 30 and 1,100 psi. The amine solvent [40] will simultaneously be injected into the second precipitator unit [36] at a pressure ranging between 30 psi and the critical pressure of the amine solvent preferably through the coaxial annulus of the same concentric nozzle [38] to selectively precipitate brucite.

The outlet stream from the second precipitator unit [36] will be fed into the second thickener-stage of hydrocyclones [42] to separate the formed brucite precipitates from the stream. The brucite slurry in the under flow stream [44] of the hydrocyclones [42] will be dewatered by a vacuum filter [46]. The dewatered brucite precipitates [48] will be recovered as a commodity and the recovered water [50] that may contain very fine precipitates will be recycled to the bottom of the second precipitator unit [36]. The recovered amine solvent [52] will be recycled to the amine storage tank [82].

In the third stage of the CPP process, calcium chloroaluminate or calcium chloroferrate is targeted for selective separation from produced water. The over flow stream [54] from the second stage of hydrocyclones [42] (depleted of mainly barium, radium, radium's decay series, and brucite) will be mixed with a sufficient aluminum or iron source [84] via a chemical eductor (not shown) and injected into the third precipitator unit [56] preferably via the inner tube of at least one concentric nozzle [58]. The pressure of such a stream [54] will be between 30 and 1,100 psi. The selected amine solvent will simultaneously be injected [60] into the third precipitator unit [56] at a pressure ranging between 30 psi and the critical pressure of the amine solvent preferably through the coaxial annulus of the same concentric nozzle [58] to selectively precipitate calcium chloroaluminate or calcium chloroferrate.

The chloride concentration ion in produced water is roughly about 4-times the calcium concentration. As such, the addition of a calcium source such as lime or hydrated lime would: (1) not only increase the amount of the precipitated calcium chloroaluminate or chloroferrate but also would minimize, if not eliminate, the use of the amine solvent (furnish the hydroxide ion); and (2) reduce the TDS of the treated produced water (binding with an additional amount of the chloride ion) to make it more amenable to desalination methods. It should be understood therefore that the addition of lime or hydrated lime could replace the addition of the amine solvent [60] into the third precipitator unit [56]. In this case, lime or hydrated lime (instead of an amine solvent) along with an aluminum or iron source [84] can be mixed via a chemical eductor (not shown) with the over flow stream [54] from the second stage of hydrocyclones [42]. It is worth noting that the over flow stream [54] still contains a large portion of the injected amine solvent in the first two CPP stages.

The outlet stream from the third precipitator unit [56] will be fed into the third thickener-stage of hydrocyclones [62] to separate the formed precipitates of calcium chloroaluminate or chloroferrate from the stream. Precipitates slurry in the under flow stream [64] of the hydrocyclones [62] will be dewatered by a vacuum filter [66]. The dewatered precipitates of calcium chloroaluminate or calcium chloroferrate [68] will be recovered as a commodity and the recovered water [70] that may contain very fine precipitates will be recycled to the bottom of the third precipitator unit [56]. The recovered amine solvent [72] will be recycled to the amine storage tank [82].

The over flow stream [74] of the third stage of hydrocyclones [62] that contains the amine solvent and produced water (rich with nearly sylvinite) will be fed into a vapor-liquid equilibrium based stripping unit [76] to separate the sylvinite-rich produced water [78] from the amine solvent [80]. The stripping unit could be a flash drum, a vacuum or standard distillation tower, a vacuum membrane distillation, a vacuum deaerator, or a pervaporation. The recovered amine solvent [80] will be recycled to the amine storage tank [82]. The nearly sylvinite-rich produced water [78] can be used for, but not limited to, oil-fields saline water injection operations or fire extinguishing in oil fields or dust control.

It should be understood that multiple precipitator units in each stage of the CPP process instead of a single precipitator unit can be implemented as needed.

It should also be understood that multiple concentric nozzles can be installed within a single precipitator unit in any given stage of the CPP process.

It should also be understood that the amine solvent (or sulfate-rich saline water or other additives) and produced water can be injected into the precipitator unit via two or multiple but separate spray nozzles.

It should also be understood that the amine solvent (or sulfate-rich saline water or other additives) and produced water can be co-injected via a mixing twin-fluid nozzle or multiple mixing twin-fluid nozzles before entering the precipitator unit.

It should also be understood that hydrocyclones in the CPP process can be eliminated, and thus vacuum filters would be the main filtration units. One of the purposes of using vacuum filters is to capture and provide better recovery for the amine solvent.

It should also be understood that the CPP process can be implemented, for instance, in: (1) a single-stage to only de-NORM produced water; or (2) a dual-stage to de-NORM produced water and then to recover brucite; or (3) a triple-stage to de-NORM produced water and then to separately and sequentially recover brucite and calcium chloroaluminate or chloroaferrate; or (4) a dual-stage to de-NORM produced water in the first stage and then to recover a blend of brucite and calcium chloroaluminate or chloroaferrate in the second stage. The treated produced water from such processing schemes can also be used, but not limited to, for oil-fields water injection operations, fire extinguishing, or dust control.

Integration of the Precipitation Concept with the Hydrophobic Membranes Concept

Figure 5:
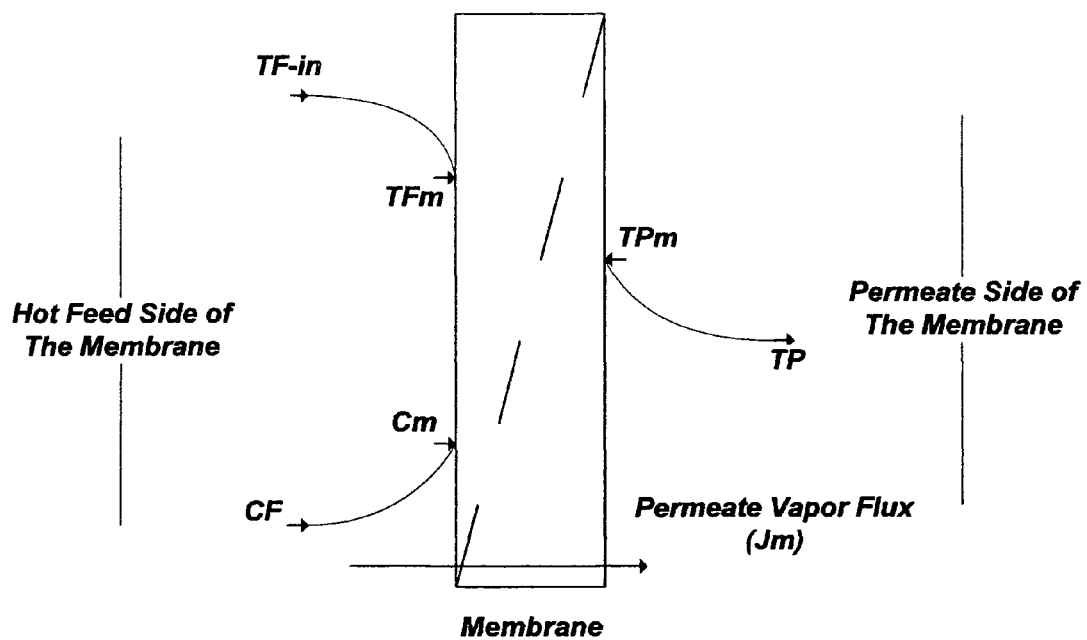
FIG. 5 illustrates a simplified schematic diagram for the flow direction and the polarization of temperature and concentration in Membrane Distillation.

Membrane Distillation (MD) refers to the transport of the vapor phase through pores of a hydrophobic membrane that separate two liquid streams. The liquid streams cannot enter the membrane pores unless the applied pressure is greater than the specified "capillary or liquid entry" pressure for the porous partition of a given membrane. In the absence of such a pressure, vapor-liquid interfaces are formed on both sides of the membrane pores due to surface tension forces. Under these conditions, if a temperature difference is applied, a vapor pressure gradient will be created on both interfaces. Evaporation will take place at the hot membrane interface (feed), water vapor will transport through the membrane pores with a convective and/or diffusion mechanism, and vapor condensation will take place at the cold side of the membrane interface (permeate). Thus, the net permeate vapor flux will be from the hot feed stream to the cold condensate stream. FIG. 5 shows a schematic diagram for the flow direction in MD.

MD has several clear advantages compared to conventional pressure-driven membranes (e.g., RO) or thermal-driven (e.g., MSF, ME and the like) desalination processes. First, MD can take place at a very low pressure that is slightly above atmospheric pressure (e.g., 15 psi), which is contrary to RO that ought to be operated at high pressures (e.g., 1,100-1200 psi) to exceed the natural osmotic pressure of the saline stream (e.g., seawater) and to achieve the required recovery. It is worth noting that RO is inapplicable to most produced waters due to their high osmotic pressures.

Second, MD can be conducted at temperatures that are significantly lower than the boiling point of water (e.g., 40-70° C.). Any form of waste heat (e.g., the inherited thermal energy within produced water along with gas flares within the producing oil fields or gathering centers) or low grade energy sources (wind or solar or geothermal or solar ponds) can be used to operate MD.

Third, the MD product stream from any saline streams that contain non-volatile ions is an ultra-pure. Entertainment of dissolved ions in the product stream, as in the case with RO (or NF), is avoided. For an oil producer, the MD product stream would be ideally suited for applications such as enhanced oil recovery (EOR) by stream injection or desalting crude oil (wash water).

Fourth, the evaporation surface of MD can be made similar to the available various pressure-driven membrane modules (e.g., hollow fiber, spiral wound, etc.). The modularity of MD thus allows the ease of adding processing capacity as needed.

The apparent simplicity of MD, however, obscures complex and simultaneous mass and heat transfer interactions. The mass water vapor flux in MD is a function of the "membrane permeability coefficient" ($K_m$) and the vapor pressure difference across the membrane:

$$J_m = K_m [p_{Fm}^s(T_{Fm}) - p_P] \tag{3}$$

where $p_{Fm}^s$ is the saturated vapor pressure of the hot feed stream at the membrane surface temperature ($T_{Fm}$) rather than the bulk (inlet) feed temperature ($T_F$), and $p_P$ is the permeate stream pressure. $K_m$ is a function of the membrane structure such as porosity ($\epsilon$), pore size radius (r), thickness ($\delta$), and tortuosity ($\chi$):

$$K_m = \frac{2\varepsilon r}{3\chi\delta}\frac{1}{RT}\sqrt{\frac{8RT}{\pi}} \quad (4)$$

$T_{Fm}$, as the driving force for the water vapor flux across the membrane, not only affects the vapor-liquid equilibrium in the feed stream but also affects the hydrodynamics in the feed stream liquid phase since its dependent on salts concentrations at the membrane surface.

As water evaporation in MD takes place, the viscosity of saline water feed stream increases with increasing salts concentrations. This would elevate the osmotic pressure, depress the vapor pressure, and alter heat and mass transfer coefficients across the membrane boundary layers. The saturated vapor pressure of saline water can be related to its osmotic pressure as follows:

$$p_{Fm}^s = \frac{p^\circ}{\exp\left[\frac{\Pi_{Fm}\tilde{v}_w}{RT_{Fm}}\right]} \quad (5)$$

where at $T_{Fm}$, $p_{Fm}^s$ is the saturated vapor pressure of a saline stream (mmHg), $p^\circ$ is the vapor pressure of pure water (mmHg), $\Pi_{Fm}$ is the osmotic pressure of a saline stream (psi), $\tilde{v}_w$ is the water molar volume (L/gmol), and R is the ideal gas constant (L psi/gmol K).

$p^\circ$ can be accurately estimated using Antoine equation. The osmotic pressure ($\Pi_{Fm}$) of a saline stream can be estimated as follows:

$$\Pi = 1.19 T_{Fm} \Sigma M_i \quad (6)$$

where $M_i$ is the molar concentration of individual ions (mol/L).

Eqs. (3) to (5) imply that in order to enhance or achieve an acceptable level of the water vapor flux, the value of either $K_m$ or $T_{Fm}$ or both values must be increased. As given in Eq. (4), the membrane structure is the key to optimize $K_m$. The $K_m$ value of hydrophobic membranes is typically very low (e.g., about 0.21 Kg/m²·hr·mmHg) to prevent water in the liquid phase from passing through the membrane pores. A slight increase in the $K_m$ value is possible, which could drastically improve water vapor flux, but it should not be at the expense of the loosing the membrane hydrophobicity. As such, a balance ought to be strike between improving the value of $K_m$ and maintaining the membrane hydrophobicity.

$K_m$ is also, to some degree, temperature dependent (decreases by 3% with a 10° C. increase in the mean temperature). The molecular mean free path for water vapor at 60° C. is about 0.3 μm. If convective transport is dominant across the membrane, the controlling factor will be the membrane pore size. If diffusive transport is dominant, however, the controlling factor will be the average mole fraction of air present within the membrane pores. Using inappropriate small membrane pore size combined with an increase in the feed stream temperature range (e.g., above 60° C.) could subsequently lead to an unintended reduction in $K_m$.

The key in increasing the value $T_{Fm}$ lies within: (1) the type of the condensation method on the permeate side of the membrane; (2) the characteristics of the membrane module and flow regime along with operating conditions including the feed stream temperature and flow rate and the permeate stream pressure; and (3) controlling the solubility limits of inorganic salts in the saline feed stream, particularly the sparingly soluble salts that pare scale prone species.

De-NORM and Partially De-Salt/De-Ionize Produced Water

If the CPP process is used to de-NORM and partially de-salt produced water (as given in the processing steps of FIG. 4), then the treated produced water will be nearly rich with sylvinite. The CPP process would thus allow the operation of MD in a scale-free manner to produce de-ionized water and sylvinite.

Figure 6:
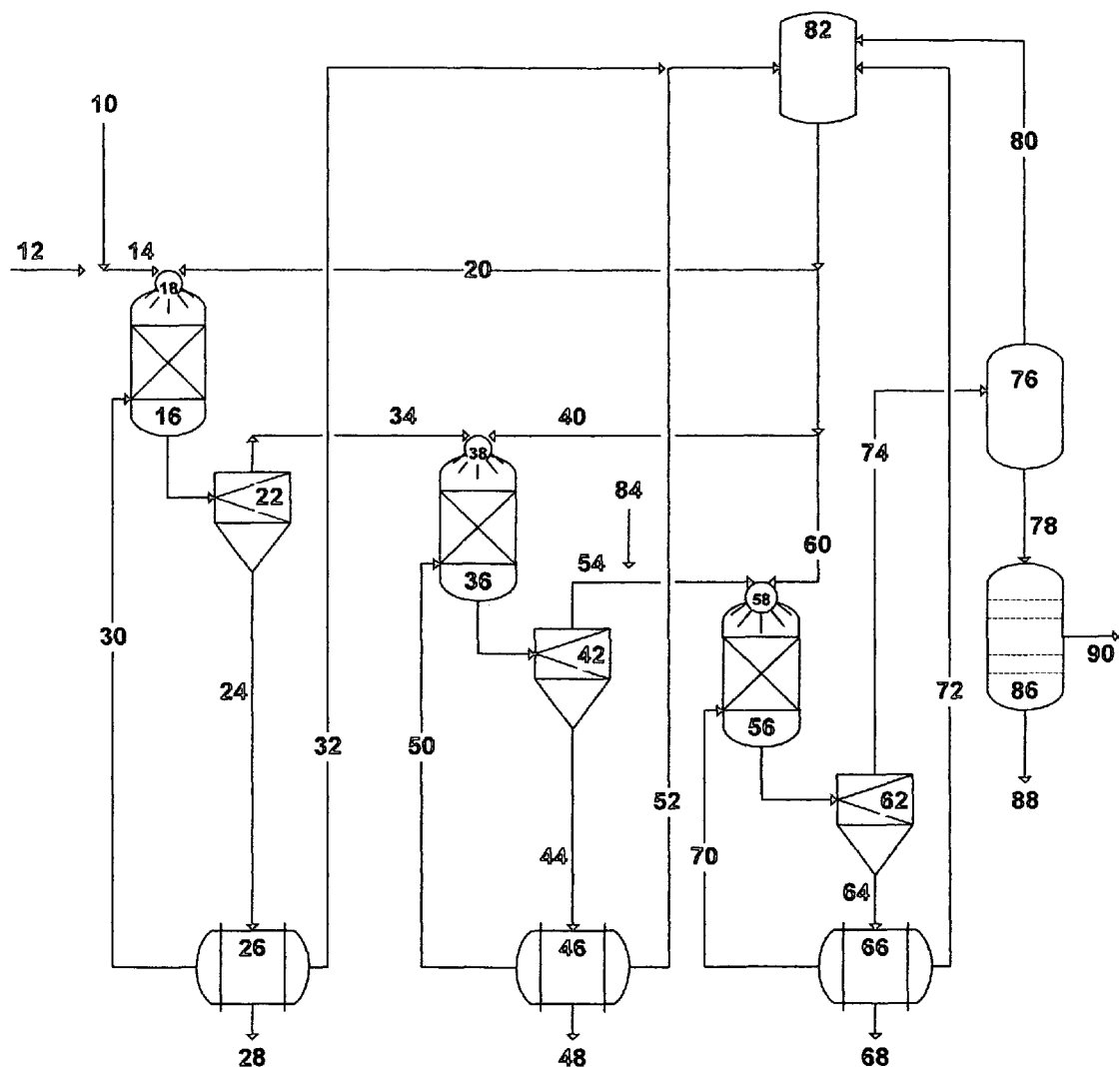
FIG. 6 illustrates a possible flow diagram for the invented method to de-NORM, and partially de-salt and de-ionize readily and sufficiently de-oiled produced water.

FIG. 6 shows an oversimplified flow diagram for the integration of the CPP with MD to de-NORM, partially de-salt, and de-ionize produced water. The processing steps [10-84] in FIG. 6 are identical to the previously described processing steps [10-84] in FIG. 4. As shown in FIG. 6, MD [86] will be conducted to produce de-ionized water [88] and sylvinite rich stream or slurry [90]. Depending on the saturation level of the rejected sylvinite-rich stream [90], it can be partially recycled to the produced water feed stream [10] or recovered as a slurry or salt.

De-Oil, De-NORM and Partially De-Salt/De-Ionize Produced Water

The natural demulsification of oil-brine liquid phases starts in some oil reservoirs where oil might preferentially squeeze through the narrow pores of organically surface coated rocks (oil wet sandstone or limestone or dolomite) and trapped by impermeable rocks (clay or shale). In such a natural downhole capillary flow, no shear or differential velocity (velocity is in the direction of the flow) or oil droplets rotation are induced. Thus, capillary flow is the most efficient method to separate oil droplets from water.

My concept is simply analogous to the natural demulsification phenomenon of crude oil. The concept takes advantages of the facts that dispersed oil droplets and produced water are immiscible and a properly configured hydrophobic membrane would efficiently repel water (the non-wetting liquid) and allow oil droplets (the membrane wetting species) to permeate through the hydrophobic membrane by applying a very low pressure.

However, such water repellent membranes do not permit passage of water through the membrane until the water capillary pressure ($p_c$) of the membrane is exceeded. $p_c$ depends on the interfacial tension, contact angle, and the pore size distribution of the membrane as reflected by the following relation:

$$p_c = \frac{2\tau_{w-o}\cos\theta_{w-o}}{r} \quad (7)$$

where $\tau_{w-o}$ is the water-oil interfacial tension, $\theta_{w-o}$ is the contact angle of a water droplet on the membrane surface in the presence of oil, r is the radius of the membrane pore.

The value of the $\theta_{w-o}$ can be related to various interfacial tensions as follows:

$$\cos\theta_{w-o} = \frac{\tau_{m-w} - \tau_{m-o}}{\tau_{w-o}} \quad (8)$$

where $\tau_{m-w}$ is interfacial tension of a membrane in contact with water, and $\tau_{m-o}$ is the interfacial tension of the same membrane in contact with oil. If $\tau_{m-w}$ is greater than $\tau_{m-o}$, then the membrane is hydrophobic ($0<\theta_{w-o}<90°$). This means that the value of $p_c$ is positive and thus the membrane is oil wet that permits the passage of oil droplets and repels water. If, however, $\tau_{m-w}$ is lower than $\tau_{m-o}$, then the membrane is hydrophilic ($\theta_{w-o}>90°$). This means that the value of $p_c$ is negative, and the membrane is water wet that permits the passage of water and prevents oil droplets from entering the membrane pores against the applied pressure ($p_a$).

Figure 7:
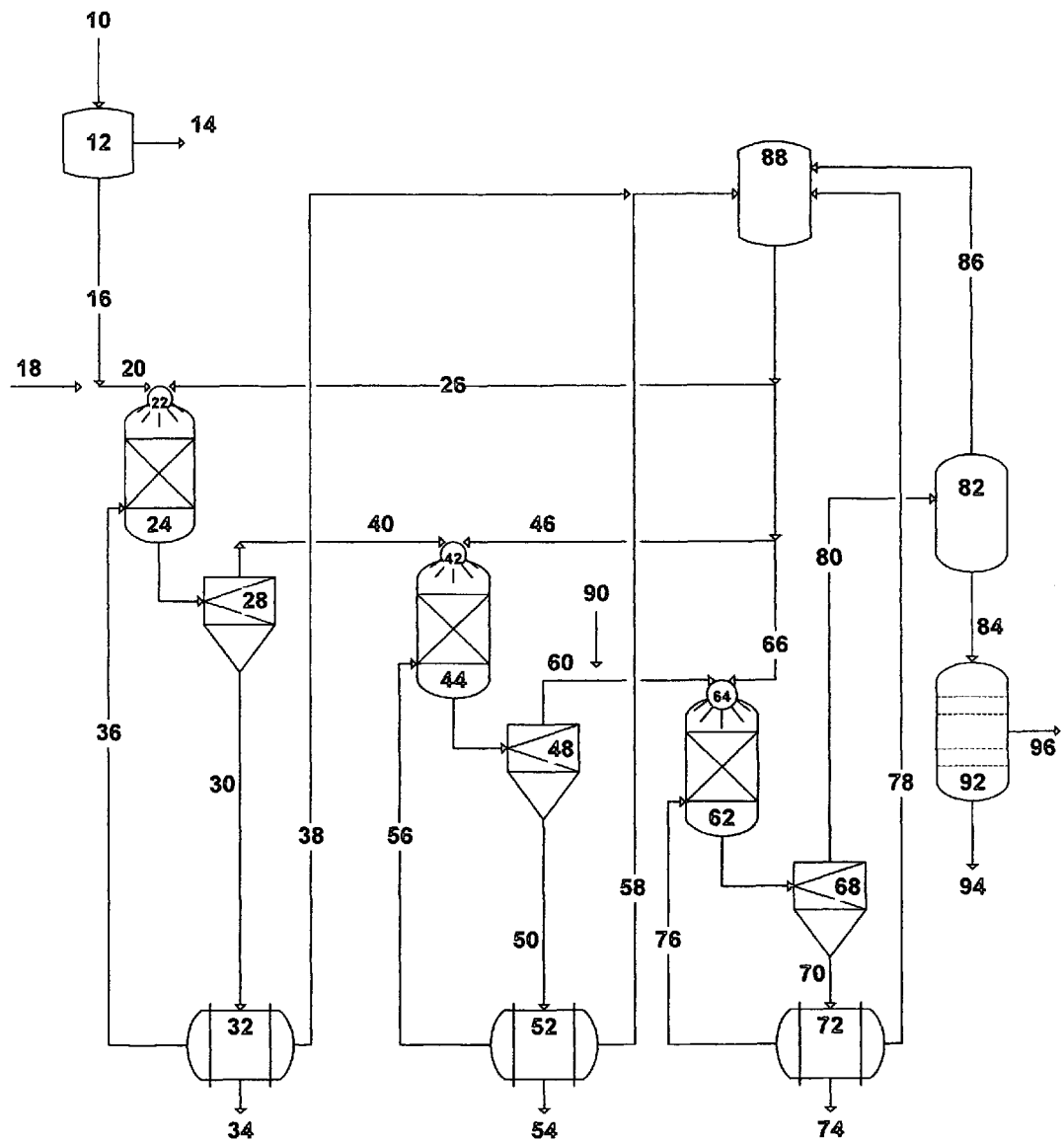
FIG. 7 illustrates a possible flow diagram for the invented method to de-oil, de-NORM, and partially de-salt and de-ionize produced water.

FIG. 7 shows the integration of produced water de-oiling step with the de-salting and de-ionizing steps. Oil-fields produced water [10] will be fed into a stage of hydrophobic membranes [12] to recover oil droplets in a near pure form [14] from produced water [16]. The applied pressure ($p_a$) in this stage will be below the capillary pressure of water ($p_c$) so that hydrophobic membranes repel water and allow only the passage of oil droplets as a product stream.

The de-oiled produced water [16] will then be treated by the CPP process as a standalone (FIG. 4) or the integrated CPP-MD process (FIG. 6). The processing steps [16-90] in FIG. 7 are identical to the previously described processing steps [10-84] in FIG. 4. The processing steps [16-96] in FIG. 7 are identical and to the previously described processing steps [10-90] in FIG. 6.

De-Sulfation of Sewater and the Like of Sulfate-Rich Streams

If the precipitation process is integrated with thermal-driven seawater desalination methods to effectively deplete both alkaline (magnesium hydroxide) and sulfate (calcium sulfate) scale, the remaining salts in seawater would be nearly sodium-potassium chloride (sylvinite). In such a situation, any existing MSF desalination plant can achieve a concentration factor of 2.5 at the plant's top brine temperature ($T_{TB}$) range (90-110° C.). Table 3 presents the simulated conditions at three different values of $T_{TB}$ for a recently built MSF plant in the Arabian Gulf. The precipitation process is assumed to be integrated with an existing MSF plant (without increasing the number of stages in the heat recovery section) to simultaneously deplete magnesium (<1 mg/L) and sulfate (<10 mg/L) from seawater at the start-up of the plant operation. However, the chemical consumptions of the precipitation process might be significant to treat seawater and reduce its sulfate concentration from 3,100 mg/L to 10 mg/L. As such, one of the main objectives of integrating the precipitation process with MSF plants is to recycle as much as feasible reject brine, and thus lower concentration of sulfate in the recycle brine (reject brine+seawater) as well as increase the performance (distillate production) of the plant.

Inspection of Table 3 reveals several important issues. First, the highest recycle brine, and thus the lowest sulfate concentration to be treated by the CPP, is at the lowest $T_{TB}$ value (90° C.). As such, after the plant reaches a steady state, the sulfate concentration in the recycle brine that requires de-sulfation is about 270 mg/L, which would substantially reduce the operating cost of the precipitation process. It is worth noting, however, that the chemical consumption of the precipitation process to de-sulfate the recycle brine (415 mg/L of sulfate) at $T_{TB}$ value of 110° C. (lower volume) is insignificant compared to de-sulfate (270 mg/L of sulfate) the recycle brine at $T_{TB}$ value of 90° C. (higher volume). It is also worth noting that the solubility limit of calcium sulfate hemihydrate, for instance, at a 2.5 concentration ratio is 3,300 mg/L at 110° C. Therefore, a partial rather than substantial removal of sulfate is very feasible to optimize the chemical usage and to operate the MSF plant away below the saturation limit of calcium sulfate.

Second, the brine blow down temperature ($T_B$) at the three different $T_{TB}$ values is 58° C. As such, the number of stages in the heat recovery section can be expanded to produce further amounts of distillate without increasing the steam load. The expansion in the number of stages is controlled by the temperature drop per stage ($T_{SD}$). If the final $T_B$ is set to be 40° C., then between 8 stages (at $T_{TB}$: 110° C.) and 12 stages (at $T_{TB}$:90° C.) can be added, which would increase the distillate volume by about 50%. Clearly, the lowest $T_{SD}$ (1.39° C.) provides the largest expansion of number of stages. However, this means reduction in the temperature driving force which demands an increase in the heat transfer area of pre-heater/condenser tubes. In addition, the boiling point of the recycle brine at about 2.5 concentration ratio would be also elevated.

Third, the brine blow down stream is nearly depleted of sulfate, and thus it's an ideal stream for oil-fields water injection operations.

It should be pointed out that the precipitation process can also facilitate operating a larger MSF plant (e.g., 69 stages) at higher concentration ratio (e.g., 3.5) and $T_{TB}$ range (e.g., 120-150° C.). This would allow better performance ratio (e.g., 20), higher production of distillate at low cost, and steady operation (due to better performance of heat transfer coefficients).

Figure 8:
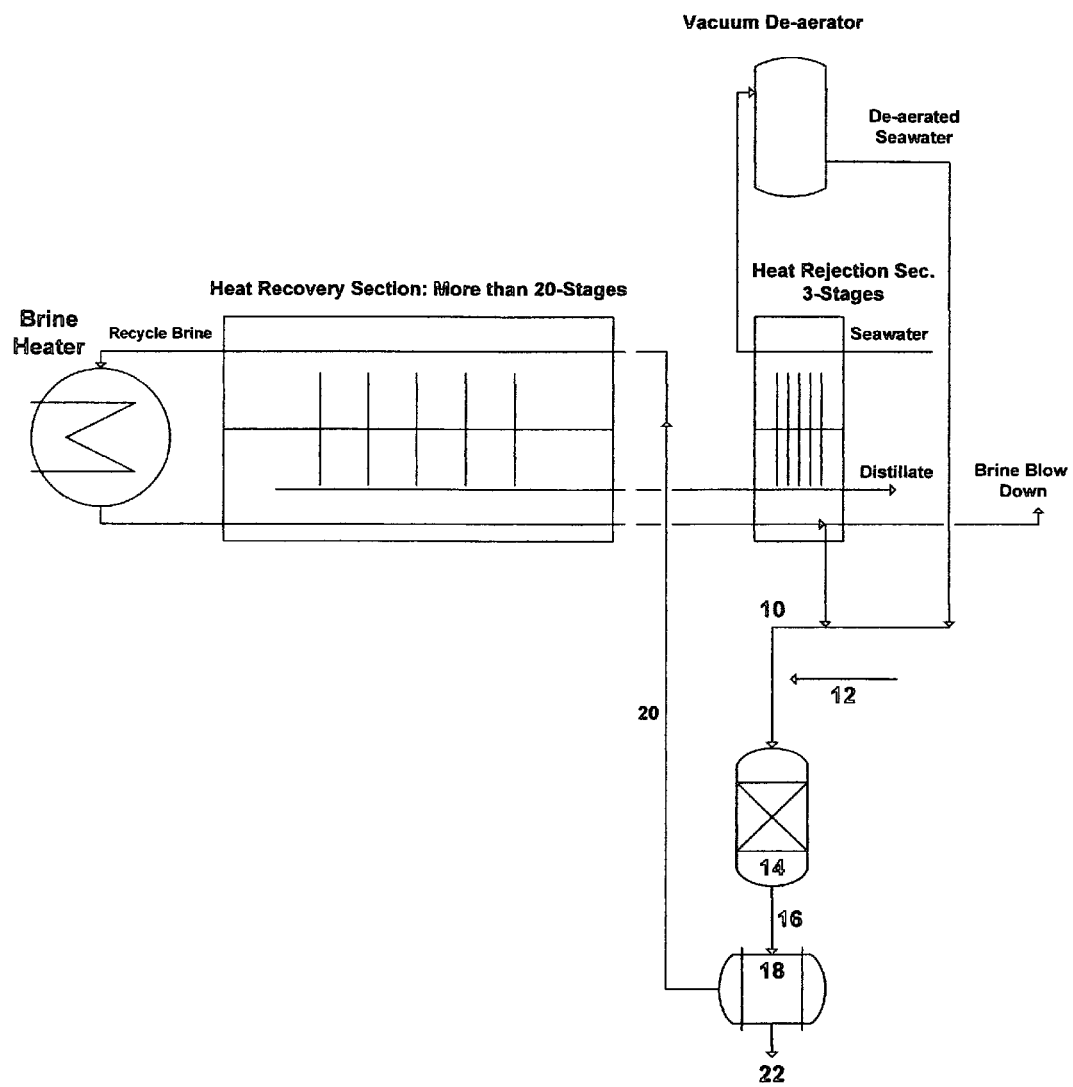

FIG. 8 depicts a simplified flow diagram for the integration of the CPP with an existing MSF Plant by a simple modification. The precipitation of both magnesium and sulfate ions (along with minor scale and regulated species such as calcium carbonate, silica and boron) is simultaneously targeted by the CPP. Sulfate, which is the main target, can be precipitated as calcium sulfoaluminate or calcium sulfoferrate. As such, a sufficient source of aluminum or iron along with a sufficient calcium source at relatively high pH are required to properly engage the existing concentrations of calcium and sulfate ions: (1) in seawater at the start-up operation; or (2) in the recycle brine once the plant reaches the feasible minimal ratio of seawater make-up to reject brine (and thus the feasible minimal concentration of sulfate; see for example Table 3).

The possible aluminum sources are calcium chloroaluminate, calcium aluminate, sodium aluminate, aluminum acetate, aluminum chloride, aluminum nitrate, and aluminum sulfate. The possible iron sources are calcium chloroferrate, calcium ferrate, sodium ferrate, and iron chloride. The possible calcium sources are lime or hydrated lime. However, calcium chloroaluminate or calcium chloroferrate that can be produced locally from oil-fields produced water could meet the dual need for calcium-aluminum or calcium-iron.

As shown in FIG. 8, the recycle brine [10] will be mixed with appropriate amounts of either calcium-aluminum or calcium-iron sources [12] and injected into the precipitator unit [14] via a premixing nozzle (not shown) to precipitate brucite along with calcium sulfoaluminate or calcium sulfoferrate. The outlet stream from the precipitator unit [16] will be fed into a vacuum filter [18] to separate the formed precipitates from the stream. The precipitates-free recycle brine [20] will be fed into the last stage of the MSF heat recovery section whereas the dewatered precipitates [22] will be recovered as a commodity. The preference of choosing a vacuum filter [18] over other filtration devices (e.g., hydrocyclone, press filter, centrifuge, etc.) is that it also de-aerates the precipitates-free recycle brine before it enters the heat recovery section. It is worth noting that the precipitation step would allow increasing the number of stages in the heat recovery section without increasing the steam load.

Figure 9:
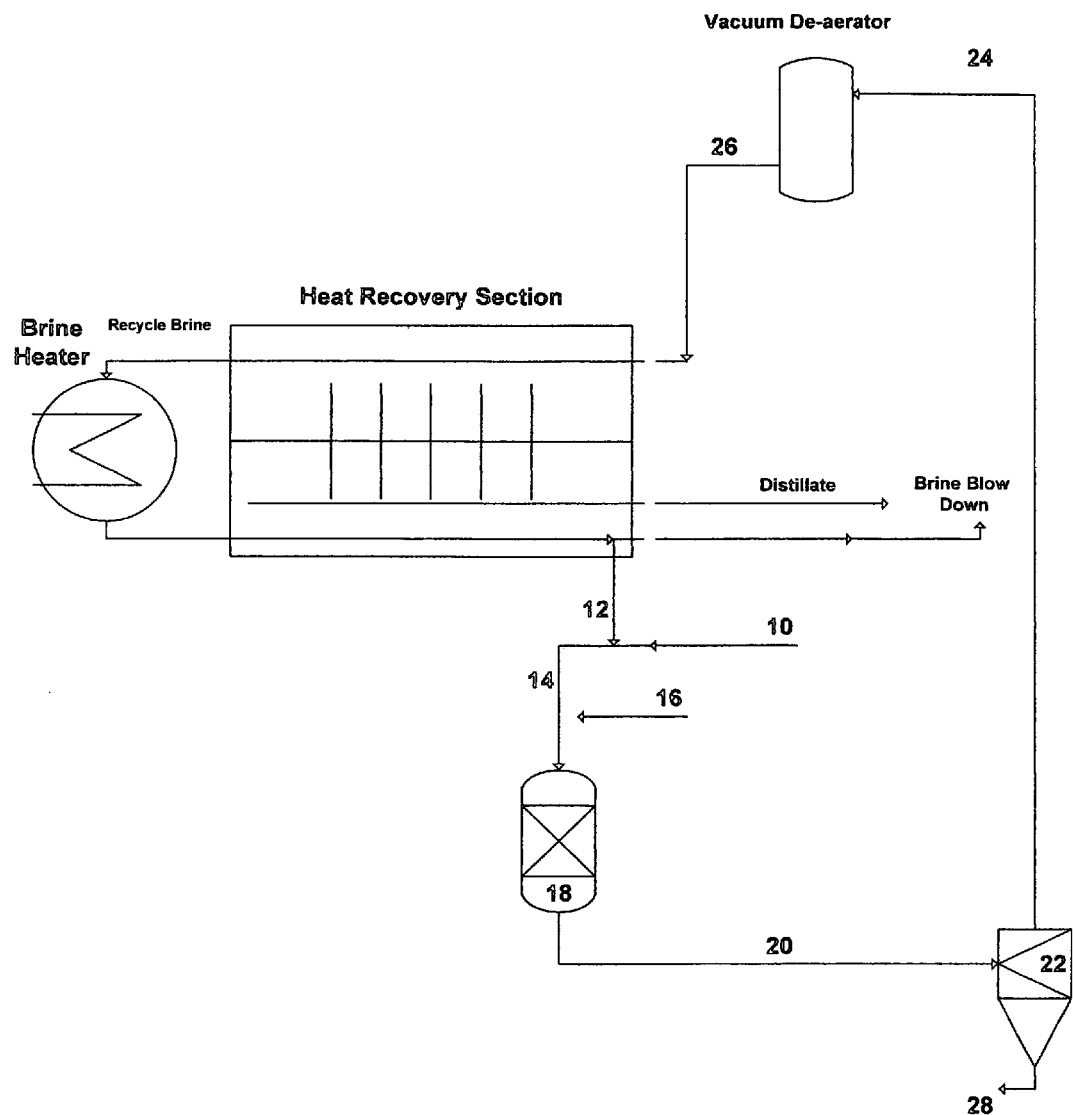

Alternatively, FIG. 9 depicts another simplified possible flow diagram for integrating the precipitation step with an existing MSF plant. As shown in FIG. 9, the 3-stages of the heat rejection section can be combined with the heat recovery section. It should be pointed out that the stages of heat recovery can be further expanded without increasing the original steam load. Seawater [10] will be mixed with reject brine from the last flashing stage [12] to generate the recycle brine [14]. Since seawater temperature is about 30° C. and the temperature of the reject brine is about 40° C., the thermal shock could cause partial decomposition of the bicarbonate ion to generate carbon dioxide and form partial precipitates of calcium carbonate and brucite. The recycle brine [14] will then be mixed with appropriate amounts of either calcium-aluminum or calcium-iron sources [16] and injected into the precipitator unit [18] via a premixing nozzle (not shown) to precipitate brucite along with calcium sulfoaluminate or calcium sulfoferrate. The outlet stream from the precipitator unit [20] will be fed into a hydrocyclone stage [22] (or other filtration units such as centrifuge) to separate the formed precipitates [28] from the stream [24]. The precipitates-free recycle brine [24] will be fed into the vacuum de-aerator (of the existing MSF plant). The de-aerated precipitates-free recycle brine [26] will be fed into the last stage of the MSF heat recovery section. The formed precipitates [28] will be further de-watered and recovered as a commodity.

It should be pointed out that the precipitation process can also be integrated with small MSF or Multiple Effect (ME) or Mechanical Vapor Recompression (MVR) or MD plants by applying the same concept of recycling as much as feasible reject brine, and thus lower concentration of sulfate in the recycle brine (reject brine+seawater) and improve the plant's performance. For instance, oil producers in arid areas are always seeking independent sources of fresh or distillate water (e.g., for steam generation and injection in oil-fields operations or for desalting crude oil) as well as sulfate-depleted sources for oil-fields water injection operations (the brine blow down stream would be ideal for such a vital application).

It should also be pointed out that the precipitation process can also be integrated with a reverse osmosis (RO) plant by applying the same concept of recycling up to 50% of reject brine, and thus lower concentration of sulfate in the recycle brine (reject brine+seawater) by 50%. However, the imposed limitation on the amount of the reject brine is attributed to the osmotic pressure of the recycle brine that impairs the RO productivity.

It should also be pointed out that the precipitation process can also be integrated with any desalination methods by blending an optimum amount of seawater with, for instance, brackish water that contains comparable TDS concentration and at least partially sulfate-rich (e.g., Table 1: S1+S6 at different ratios) to reduce the sulfate concentration in the blend stream, and then by applying the same concept of recycling as much as feasible of reject brine from the selected desalination method, and thus lower further the concentration of sulfate in the recycle brine (reject brine+blend stream).

TABLE 1

Ions Concentrations in Samples of Produced Water and Sulfate-Rich Streams.

| Ion | S1: mg/L (meq./L) | S2: mg/L (meq./L) | S3: mg/L (meq./L) | S4: mg/L (meq./L) | S5: mg/L (meq./L) | S6: mg/L (meq./L) |
|---|---|---|---|---|---|---|
| Cations | | | | | | |
| $Na^+$ | 68,959 (2,998.2) | 12,170 (529.1) | 11,990 (521.3) | 20,090 (873.5) | 23,240 (1,010.4) | 4,800 (209) |
| $K^+$ | 2,851 (72.9) | 420 (10.7) | 93 (2.4) | 1,024 (26.2) | 740 (18.9) | 49 (1.3) |
| $Mg^{+2}$ | 3,198 (263.2) | 1,530 (125.9) | 190 (15.6) | 2,330 (191.7) | 2,890 (237.8) | 513 (42.2) |
| $Ca^{+2}$ | 19,014 (950.7) | 540 (27) | 498 (24.9) | 837 (41.7) | 1,750 (87.5) | 1,320 (66) |
| $Sr^{+2}$ | 535 (12.2) | 7 (0.2) | 28 (0.6) | 21 (0.5) | N.D. | |
| $Ba^{+2}$ | 10 (0.2) | N.D. | N.D. | N.D. | N.D. | |

TABLE 1-continued

Ions Concentrations in Samples of Produced Water and Sulfate-Rich Streams.

| Ion | S1: mg/L (meq./L) | S2: mg/L (meq./L) | S3: mg/L (meq./L) | S4: mg/L (meq./L) | S5: mg/L (meq./L) | S6: mg/L (meq./L) |
|---|---|---|---|---|---|---|
| Anions | | | | | | |
| $Cl^-$ | 150,948 (4,258.1) | 22,100 (623) | 17,970 (506.9) | 36,164 (1,020.1) | 40,650 (1,146.7) | 9,300 (262) |
| $HCO_3^-$ | 256 (4.2) | 140 (2.3) | 20 (0.3) | 256 (4.2) | 160 (2.6) | 100 (1.6) |
| $SO_4^{-2}$ | 108 (2.3) | 3,100 (64.6) | 3,045 (63.4) | 5,099 (106.2) | 5,430 (113.1) | 1,300 (27.1) |

S1: Sample of Produced Water from a Hydrocarbons Production Facility;
S2: Seawater from the Arabian Gulf;
S3: Sulfate-Rich Natural Brine;
S4: RO Brine from Seawater Treatment (Arabian Gulf);
S5: MSF Brine Seawater Treatment (Arabian Gulf).
S6: Brackish Water (Arabian Gulf).

TABLE 2

Ions Material Balance between Produced Water (vol. %) and Sulfate-Rich Saline Water (vol. %) to Satisfy the Unbalanced Sulfate Portion of Strontium.

| Ion | S1 + S2 (80% + 20%) (meq./L) | S1 + S3 (80% + 20%) (meq./L) | S1 + S4 (90% + 10%) (meq./L) | S1 + S5 (90% + 10%) (meq./L) |
|---|---|---|---|---|
| Cations | | | | |
| $Na^+$ | 2,504.0 | 2,495.0 | 2,786.0 | 2,799.0 |
| $K^+$ | 61.0 | 59.0 | 68.0 | 68.0 |
| $Mg^{+2}$ | 236.0 | 214.0 | 256.0 | 261.0 |
| $Ca^{+2}$ | 766.0 | 766.0 | 860.0 | 864.0 |
| $Sr^{+2}$ | 9.8 | 9.9 | 11.0 | 11.0 |
| $Ba^{+2}$ | ≈0.2 | ≈0.2 | ≈0.2 | ≈0.2 |
| Anions | | | | |
| $Cl^-$ | 3,531.0 | 3508.0 | 3934.0 | 3,947.0 |
| $HCO_3^-$ | 3.8 | 3.4 | 4.2 | 4.0 |
| $SO_4^{-2}$ | 14.8 | 14.5 | 12.7 | 13.4 |

S1: Sample of Produced Water from a Hydrocarbons Production Facility;
S2: Seawater from the Arabian Gulf;
S3: Sulfate-Rich Natural Brine;
S4: RO Brine from Seawater Treatment (Arabian Gulf);
S5: MSF Brine Seawater Treatment (Arabian Gulf).

TABLE 3

Projected MSF Operating Conditions.

| Assumed Variables: | | | |
|---|---|---|---|
| $C_S$ (mg/L) | 40,000 | 40,000 | 40,000 |
| $C_B$ (mg/L) | 100,000 | 100,000 | 100,000 |
| $C_B/C_S$ | 2.5 | 2.5 | 2.5 |
| $T_S$ (° C.) | 30 | 30 | 30 |
| $T_{TB}$ (° C.) | 110 | 100 | 90 |
| PR | 12 | 12 | 12 |
| # SHRS | 23 | 23 | 23 |
| $Q_D$ (kg/s) | 593 | 593 | 593 |
| Calculated Variables: | | | |
| $T_B$ (° C.) | 58.1 | 58.1 | 58.1 |
| $T_{SD}$ (° C.) | 2.26 | 1.82 | 1.39 |
| $Q_r$ (kg/s) | 6402 | 7,939 | 10,435 |
| $C_r$ (mg/L) | 90,740 | 92,530 | 94,319 |
| $Q_s$ (kg/s) | 988 | 988 | 988 |
| $Q_B$ (kg/s) | 395 | 395 | 395 |
| $Q_S/[Q_r + Q_S]$ (%) | 13.4 | 11.1 | 8.7 |
| $R\text{-}SO_4^{-2}$ (mg/L) | 415 | 344 | 270 |

TABLE 3-continued

Projected MSF Operating Conditions.

$C_S$: TDS in Seawater Feed Stream;
$C_B$: TDS in Brine Blow Down Stream;
$C_B/C_S$: TDS (concentration) Ratio;
$T_S$: Seawater Feed Temperature;
$T_{TB}$: Top Brine Temperature;
PR: Performance Ratio;
SHRS: Number of Stages in the MSF Heat Recovery Section;
$Q_D$: Distillate Flow Rate;
$T_B$: Temperature of Brine Blow Down Stream;
$T_{SD}$: Stage Temperature Drop;
$Q_r$: Recycle Brine Flow Rate;
$C_r$: TDS in Recycle Brine;
$Q_s$: Seawater Flow Rate;
$Q_B$: Flow Rate of Brine Blow Down Stream;
R-$SO_4^{-2}$: Sulfate Concentration in Recycle Brine (assuming the initial concentration of sulfate in seawater is reduced from 3,100 mg/L to 10 mg/L by the CPP at the startup operation of the MSF plant).

What is claimed is:

1. A method for separating alkaline earth cations, brucite, and calcium in the form of chloroaluminate or chloroferrate from produced water to produce partially de-salted produced water, said method comprising the steps of:
   (a) removing said alkaline earth cations from said produced water by
      (i) mixing sulfate-rich saline water with said produced water to produce first intermediate stream by allowing the concentration of sulfate to exceed the concentration of strontium in said first intermediate stream;
      (ii) pressurizing said first intermediate stream into first precipitator at pressure between 30 psi and 1,100 psi through at least one nozzle to produce a jet stream of said first intermediate stream;
      (iii) pressurizing amine solvent into said first precipitator at pressure between 30 psi and the critical pressure of said amine solvent through at least one nozzle to form precipitates comprising said alkaline earth cations from said first intermediate stream;
      (iv) removing said precipitates from said first intermediate stream by first filter to produce alkaline earth cations slurry and second intermediate stream;
      (v) separating said alkaline earth cations slurry into dewatered alkaline earth cations precipitates and first liquor stream by first vacuum filter;
      (vi) recovering at least most of remaining said amine solvent from said first liquor stream by said first vacuum filter;
      (vii) recycling said first liquor stream to said first precipitator;
   (b) removing said brucite from said second intermediate stream by
      (i) pressurizing said second intermediate stream into second precipitator at pressure between 30 psi and 1,100 psi through at least one nozzle to produce a jet stream of said second intermediate stream;
      (ii) pressurizing said amine solvent into said second precipitator at pressure between 30 psi and the critical pressure of said amine solvent through at least one nozzle to form precipitates comprising said brucite from said second intermediate stream;
      (iii) removing said precipitates from said second intermediate stream by second filter to produce brucite slurry and third intermediate stream;
      (iv) separating said brucite slurry into dewatered brucite precipitates and second liquor stream by second vacuum filter;
      (v) recovering at least most of remaining said amine solvent from said second liquor stream by said second vacuum filter;
      (vi) recycling said second liquor stream to said second precipitator;
   (c) removing said calcium in the form of said chloroaluminate or said chloroferrate from said third intermediate stream by
      (i) mixing said third intermediate stream with an aluminum or iron source to produce a blended third intermediate stream;
      (ii) pressurizing said third blended intermediate stream into third precipitator at pressure between 30 psi and 1,100 psi through at least one nozzle to produce a jet stream of said blended third intermediate stream;
      (iii) pressurizing said amine solvent into said third precipitator at pressure between 30 psi and the critical pressure of said amine solvent through at least one nozzle to form precipitates comprising said calcium in the form of said chloroaluminate or said chloroferrate from said third blended intermediate stream;
      (iv) removing said precipitates from said blended third intermediate stream by third filter to produce slurry of said calcium in the form of said chloroaluminate or said chloroferrate and fourth intermediate stream;
      (v) separating said slurry into dewatered precipitates and third liquor stream by another vacuum filter;
      (vi) recovering at least most of remaining said amine solvent from said third liquor stream by said another vacuum filter;
      (vii) recycling said third liquor stream to said third precipitator;
      (viii) removing at least most of said amine solvent from said fourth intermediate stream by stripping unit to produce said partially de-salted produced water;
   (d) injecting said partially de-salted produced water into subterranean formation for hydrocarbons recovery; or
   (e) using said partially de-salted produced water for oil-fields fire extinguishing; or
   (f) using said partially de-salted produced water for dust control; or
   (g) producing de-ionized water from said partially de-salted produced water by membrane distillation or other desalination processes.

2. The method of claim 1 wherein said alkaline earth cations are strontium, barium, radium, radon, polonium, bismuth, thallium, lead, or a combination thereof.

3. The method of claim 1 wherein said produced water is oil-fields produced water, methane-bed produced water, coal-bed produced water, formation water, or a combination thereof.

4. The method of claim 1 wherein said sulfate-rich saline water is seawater, brine streams from seawater desalination plants, sulfate-rich natural brine, agricultural drainage water, flue gas desulphurization water, or a combination thereof.

5. The method of claim 1 wherein said amine solvent is selected from the group consisting of isopropylamine, propylamine, dipropylamine, diisopropylamine, ethylamine, diethylamine, methylamine, dimethylamine, or a combination thereof.

6. The method of claim 1 wherein said aluminum source is selected from the group consisting of calcium aluminate, sodium aluminate, aluminum acetate, aluminum chlorohydrate, and aluminum chloride.

7. The method of claim 1 wherein said iron source is selected from the group consisting of calcium ferrate, sodium ferrate, and iron chloride.

8. A method for separating alkaline earth cations, brucite, and calcium in the form of chloroaluminate or chloroferrate from produced water to produce partially de-salted produced water, said method comprising the steps of:
  (a) removing said alkaline earth cations from said produced water by
    (i) mixing aluminum sulfate or iron sulfate with said produced water to produce first intermediate stream by allowing the concentration of sulfate to exceed the concentration of strontium in said first intermediate stream;
    (ii) pressurizing said first intermediate stream into first precipitator at pressure between 30 psi and 1,100 psi through at least one nozzle to produce a jet stream of said first intermediate stream;
    (iii) pressurizing amine solvent into said first precipitator at pressure between 30 psi and the critical pressure of said amine solvent through at least one nozzle to form precipitates comprising said alkaline earth cations from said first intermediate stream;
    (iv) removing said precipitates from said first intermediate stream by first filter to produce alkaline earth cations slurry and second intermediate stream;
    (v) separating said alkaline earth cations slurry into dewatered alkaline earth cations precipitates and first liquor stream by first vacuum filter;
    (vi) recovering at least most of remaining said amine solvent from said first liquor stream by said first vacuum filter;
    (vii) recycling said first liquor stream to said first precipitator;
  (b) removing said brucite from said second intermediate stream by
    (i) pressurizing said second intermediate stream into second precipitator at pressure between 30 psi and 1,100 psi through at least one nozzle to produce a jet stream of said second intermediate stream;
    (ii) pressurizing said amine solvent into said second precipitator at pressure between 30 psi and the critical pressure of said amine solvent through at least one nozzle to form precipitates comprising said brucite from said second intermediate stream;
    (iii) removing said precipitates from said second intermediate stream by second filter to produce brucite slurry and third intermediate stream;
    (iv) separating said brucite slurry into dewatered brucite precipitates and second liquor stream by second vacuum filter;
    (v) recovering at least most of remaining said amine solvent from said second liquor stream by said second vacuum filter;
    (vi) recycling said second liquor stream to said second precipitator;
  (c) removing said calcium in the form of said chloroaluminate or said chloroferrate from said third intermediate stream by
    (i) mixing said third intermediate stream with an aluminum or iron source to produce a blended third intermediate stream;
    (ii) pressurizing said third blended intermediate stream into third precipitator at pressure between 30 psi and 1,100 psi through at least one nozzle to produce a jet stream of said blended third intermediate stream;
    (iii) pressurizing said amine solvent into said third precipitator at pressure between 30 psi and the critical pressure of said amine solvent or said amine solvent with modifier through at least one nozzle to form precipitates comprising said calcium in the form of said chloroaluminate or said chloroferrate from said third blended intermediate stream;
    (iv) removing said precipitates from said blended third intermediate stream by third filter to produce slurry of said calcium in the form of said chloroaluminate or said chloroferrate and fourth intermediate stream;
    (v) separating said slurry into dewatered precipitates and third liquor stream by another vacuum filter;
    (vi) recovering at least most of remaining said amine solvent from said third liquor stream by said another vacuum filter;
    (vii) recycling said third liquor stream to said third precipitator;
    (viii) removing at least most of said amine solvent from said fourth intermediate stream by stripping unit to produce said partially de-salted produced water;
  (d) injecting said partially de-salted produced water into subterranean formation for hydrocarbons recovery; or
  (e) using said partially de-salted produced water for oil-fields fire extinguishing; or
  (f) using said partially de-salted produced water for dust control; or
  (g) producing de-ionized water from said partially de-salted produced water by membrane distillation or other desalination processes.

9. The method of claim 8 wherein said alkaline earth cations are strontium, barium, radium, radon, polonium, bismuth, thallium, lead, or a combination thereof.

10. The method of claim 8 wherein said produced water is oil-fields produced water, methane-bed produced water, coal-bed produced water, formation water, or a combination thereof.

11. The method of claim 8 wherein said sulfate-rich saline water is seawater, brine streams from seawater desalination plants, sulfate-rich natural brine, agricultural drainage water, flue gas desulphurization water, or a combination thereof.

12. The method of claim 8 wherein said amine solvent is selected from the group consisting of isopropylamine, propylamine, dipropylamine, diisopropylamine, ethylamine, diethylamine, methylamine, dimethylamine, or a combination thereof.

13. The method of claim 8 wherein said aluminum source is selected from the group consisting of calcium aluminate, sodium aluminate, aluminum acetate, aluminum chlorohydrate, and aluminum chloride.

14. The method of claim 8 wherein said iron source is selected from the group consisting of calcium ferrate, sodium ferrate, and iron chloride.

15. A method for separating oil, alkaline earth cations, brucite, and calcium in the form of chloroaluminate or chloroferrate from produced water to produce de-oiled and partially de-salted produced water, said method comprising the steps of:
  (a) separating said oil from said produced water by hydrophobic membranes to produce de-oiled produced water;
  (b) removing said alkaline earth cations from said de-oiled produced water by
    (i) mixing sulfate-rich saline water with said de-oiled produced water to produce first intermediate stream by allowing the concentration of sulfate to exceed the concentration of strontium in said first intermediate stream;
    (ii) pressurizing said first intermediate stream into first precipitator at pressure between 30 psi and 1,100 psi through at least one nozzle to produce a jet stream of said first intermediate stream;

(iii) pressurizing amine solvent into said first precipitator at pressure between 30 psi and the critical pressure of said amine solvent through at least one nozzle to form precipitates comprising said alkaline earth cations from said first intermediate stream;
(iv) removing said precipitates from said first intermediate stream by first filter to produce alkaline earth cations slurry and second intermediate stream;
(v) separating said alkaline earth cations slurry into dewatered alkaline earth cations precipitates and first liquor stream by first vacuum filter;
(vi) recovering at least most of remaining said amine solvent from said first liquor stream by said first vacuum filter;
(vii) recycling said first liquor stream to said first precipitator;

(c) removing said brucite from said second intermediate stream by
  (i) pressurizing said second intermediate stream into second precipitator at pressure between 30 psi and 1,100 psi through at least one nozzle to produce a jet stream of said second intermediate stream;
  (ii) pressurizing said amine solvent into said second precipitator at pressure between 30 psi and the critical pressure of said amine solvent through at least one nozzle to form precipitates comprising said brucite from said second intermediate stream;
  (iii) removing said precipitates from said second intermediate stream by second filter to produce brucite slurry and third intermediate stream;
  (iv) separating said brucite slurry into dewatered brucite precipitates and second liquor stream by second vacuum filter;
  (v) recovering at least most of remaining said amine solvent from said second liquor stream by said second vacuum filter;
  (vi) recycling said second liquor stream to said second precipitator;

(d) removing said calcium in the form of said chloroaluminate or said chloroferrate from said third intermediate stream by
  (i) mixing said third intermediate stream with an aluminum or iron source to produce a blended third intermediate stream;
  (ii) pressurizing said third blended intermediate stream into third precipitator at pressure between 30 psi and 1,100 psi through at least one nozzle to produce a jet stream of said blended third intermediate stream;
  (iii) pressurizing said amine solvent into said third precipitator at pressure between 30 psi and the critical pressure of said amine solvent through at least one nozzle to form precipitates comprising said calcium in the form of said chloroaluminate or said chloroferrate from said third blended intermediate stream;
  (iv) removing said precipitates from said blended third intermediate stream by third filter to produce slurry of said calcium in the form of said chloroaluminate or said chloroferrate and fourth intermediate stream;
  (v) separating said slurry into dewatered precipitates and third liquor stream by another vacuum filter;
  (vi) recovering at least most of remaining said amine solvent from said third liquor stream by said another vacuum filter;
  (vii) recycling said third liquor stream to said third precipitator;
  (viii) removing at least most of said amine solvent from said fourth intermediate stream by stripping unit to produce said partially de-salted produced water;

(e) injecting said de-oiled and partially de-salted produced water into subterranean formation for hydrocarbons recovery; or
(f) using said de-oiled and partially de-salted produced water for oil-fields fire extinguishing; or
(g) using said de-oiled and partially de-salted produced water for dust control; or
(h) producing de-ionized water from said de-oiled and partially de-salted produced water by membrane distillation or other desalination processes.

16. The method of claim 15 wherein said alkaline earth cations are strontium, barium, radium, radon, polonium, bismuth, thallium, lead, or a combination thereof.

17. The method of claim 15 wherein said produced water is oil-fields produced water, methane-bed produced water, coal-bed produced water, formation water, or a combination thereof.

18. The method of claim 15 wherein said sulfate-rich saline water is seawater, brine streams from seawater desalination plants, sulfate-rich natural brine, agricultural drainage water, flue gas desulphurization water, or a combination thereof.

19. The method of claim 15 wherein said amine solvent is selected from the group consisting of isopropylamine, propylamine, dipropylamine, diisopropylamine, ethylamine, diethylamine, methylamine, dimethylamine, or a combination thereof.

20. The method of claim 15 wherein said aluminum source is selected from the group consisting of calcium aluminate, sodium aluminate, aluminum acetate, aluminum chlorohydrate, and aluminum chloride.

21. The method of claim 15 wherein said iron source is selected from the group consisting of calcium ferrate, sodium ferrate, and iron chloride.

22. A method for separating oil, alkaline earth cations, brucite, and calcium in the form of chloroaluminate or chloroferrate from produced water to produce de-oiled and partially de-salted produced water, said method comprising the steps of:
(a) separating said oil from said produced water by hydrophobic membranes to produce de-oiled produced water;
(b) removing said alkaline earth cations from said de-oiled produced water by
  (i) mixing aluminum sulfate or iron sulfate with said de-oiled produced water to produce first intermediate stream by allowing the concentration of sulfate to exceed the concentration of strontium in said first intermediate stream;
  (ii) pressurizing said first intermediate stream into first precipitator at pressure between 30 psi and 1,100 psi through at least one nozzle to produce a jet stream of said first intermediate stream;
  (iii) pressurizing amine solvent into said first precipitator at pressure between 30 psi and the critical pressure of said amine solvent through at least one nozzle to form precipitates comprising said alkaline earth cations from said first intermediate stream;
  (iv) removing said precipitates from said first intermediate stream by first filter to produce alkaline earth cations slurry and second intermediate stream;
  (v) separating said alkaline earth cations slurry into dewatered alkaline earth cations precipitates and first liquor stream by first vacuum filter;

(vi) recovering at least most of remaining said amine solvent from said first liquor stream by said first vacuum filter;
(vii) recycling said first liquor stream to said first precipitator;
(c) removing said brucite from said second intermediate stream by
 (i) pressurizing said second intermediate stream into second precipitator at pressure between 30 psi and 1,100 psi through at least one nozzle to produce a jet stream of said second intermediate stream;
 (ii) pressurizing said amine solvent into said second precipitator at pressure between 30 psi and the critical pressure of said amine solvent through at least one nozzle to form precipitates comprising said brucite from said second intermediate stream;
 (iii) removing said precipitates from said second intermediate stream by second filter to produce brucite slurry and third intermediate stream;
 (iv) separating said brucite slurry into dewatered brucite precipitates and second liquor stream by second vacuum filter;
 (v) recovering at least most of remaining said amine solvent from said second liquor stream by said second vacuum filter;
 (vi) recycling said second liquor stream to said second precipitator;
(d) removing said calcium in the form of said chloroaluminate or said chloroferrate from said third intermediate stream by
 (i) mixing said third intermediate stream with an aluminum or iron source to produce a blended third intermediate stream;
 (ii) pressurizing said third blended intermediate stream into third precipitator at pressure between 30 psi and 1,100 psi through at least one nozzle to produce a jet stream of said blended third intermediate stream;
 (iii) pressurizing said amine solvent into said third precipitator at pressure between 30 psi and the critical pressure of said amine solvent through at least one nozzle to form precipitates comprising said calcium in the form of said chloroaluminate or said chloroferrate from said third blended intermediate stream;
 (iv) removing said precipitates from said blended third intermediate stream by third filter to produce slurry of said calcium in the form of said chloroaluminate or said chloroferrate and fourth intermediate stream;
 (v) separating said slurry into dewatered precipitates and third liquor stream by another vacuum filter;
 (vi) recovering at least most of remaining said amine solvent from said third liquor stream by said another vacuum filter;
 (vii) recycling said third liquor stream to said third precipitator;
 (viii) removing at least most of said amine solvent from said fourth intermediate stream by stripping unit to produce said partially de-salted produced water;
(e) injecting said de-oiled and partially de-salted produced water into subterranean formation for hydrocarbons recovery; or
(f) using said de-oiled and partially de-salted produced water for oil-fields fire extinguishing; or
(g) using said de-oiled and partially de-salted produced water for dust control; or
(h) producing de-ionized water from said de-oiled and partially de-salted produced water by membrane distillation or other desalination processes.

23. The method of claim 22 wherein said alkaline earth cations are strontium, barium, radium, radon, polonium, bismuth, thallium, lead, or a combination thereof.

24. The method of claim 22 wherein said produced water is oil-fields produced water, methane-bed produced water, coalbed produced water, formation water, or a combination thereof.

25. The method of claim 22 wherein said sulfate-rich saline water is seawater, brine streams from seawater desalination plants, sulfate-rich natural brine, agricultural drainage water, flue gas desulphurization water, or a combination thereof.

26. The method of claim 22 wherein said amine solvent is selected from the group consisting of isopropylamine, propylamine, dipropylamine, diisopropylamine, ethylamine, diethylamine, methylamine, dimethylamine, or a combination thereof.

27. The method of claim 22 wherein said aluminum source is selected from the group consisting of calcium aluminate, sodium aluminate, aluminum acetate, aluminum chlorohydrate, and aluminum chloride.

28. The method of claim 22 wherein said iron source is selected from the group consisting of calcium ferrate, sodium ferrate, and iron chloride.

* * * * *